United States Patent
Chacko et al.

(10) Patent No.: US 7,418,417 B2
(45) Date of Patent: Aug. 26, 2008

(54) CREDIT INDEX, A SYSTEM AND METHOD FOR STRUCTURING A CREDIT INDEX, AND A SYSTEM AND METHOD FOR OPERATING A CREDIT INDEX

(75) Inventors: Varkki Chacko, Short Hills, NJ (US); Fernando Cunha, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1245 days.

(21) Appl. No.: 10/164,083

(22) Filed: Jun. 5, 2002

(65) Prior Publication Data

US 2003/0120568 A1 Jun. 26, 2003

Related U.S. Application Data

(60) Provisional application No. 60/356,957, filed on Feb. 14, 2002, provisional application No. 60/355,653, filed on Feb. 7, 2002, provisional application No. 60/302,275, filed on Jun. 29, 2001, provisional application No. 60/295,856, filed on Jun. 5, 2001, provisional application No. 60/356,080, filed on Feb. 11, 2000.

(51) Int. Cl.
*G06Q 40/00* (2006.01)

(52) U.S. Cl. ............... 705/36 R; 705/35; 705/37; 705/38

(58) Field of Classification Search ......... 705/35–45; 707/101–104
See application file for complete search history.

(56) References Cited

U.S. PATENT DOCUMENTS

| | | | |
|---|---|---|---|
| 5,704,045 A | 12/1997 | King et al. | |
| 5,761,442 A | 6/1998 | Barr et al. | |
| 5,799,287 A | 8/1998 | Dembo | |
| 5,812,987 A * | 9/1998 | Luskin et al. | ............. 705/36 R |
| 5,857,176 A | 1/1999 | Ginsberg | |
| 5,911,136 A | 6/1999 | Atkins | |
| 6,092,056 A | 7/2000 | Tull, Jr. et al. | |
| 6,278,981 B1 | 8/2001 | Dembo et al. | |
| 6,856,973 B1 | 2/2005 | Bott | |
| 6,912,511 B1 | 6/2005 | Eliezer et al. | |
| 6,968,316 B1 | 11/2005 | Hamilton | |
| 7,167,837 B1 | 1/2007 | Ciampi et al. | |
| 7,171,385 B1 | 1/2007 | Dembo et al. | |
| 2002/0174081 A1 | 11/2002 | Charbonneau et al. | |
| 2006/0265302 A1 | 11/2006 | Schmalenberger et al. | |
| 2007/0005488 A1 | 1/2007 | Keith | |

OTHER PUBLICATIONS

Book: Financial Markets & Institutions by: Jeff Madura 2nd edition ISBN: 0-314-87735-5 12 pages attached.*
U.S. Appl. No. 10/164,084, filed Jun. 5, 2002, Chacko et al.
Frank J. Fabozzi, The Handbook of Fixed Income Securities 1991, Third Edition, Business One Irwin, Chapter 41 pp. 898-911.

* cited by examiner

*Primary Examiner*—Mary Cheung
*Assistant Examiner*—Kirsten S Apple
(74) *Attorney, Agent, or Firm*—Greenberg Traurig, LLP

(57) ABSTRACT

The present invention relates to a credit index, a system and method for structuring a credit index, a system and method for operating a credit index, and a system and method for determining the liquidity of a credit.

57 Claims, 13 Drawing Sheets

| | H | I | J | K | L | M |
|---|---|---|---|---|---|---|
| 7 | | | | | | |
| 8 | Where do the Decayed Debt numbers come from? | | | | | |
| 9 | Sample: General Motors | | | | | |
| 10 | | | | | | 4/1/2002 |
| 11 | | | | | | |
| 12 | Seed | Creci | Size | Issue Dt. | Age | Decayed Size |
| 13 | 25139619 | GMAC/6.125/08 $750 | 750 | 22-Jan-98 | 4.1889 | 213.45 |
| 14 | 25140713 | GMAC/6.75/28 $600 | 800 | 29-Apr-98 | 3.9233 | 184.92 |
| 15 | 25140839 | GMAC/6.25/05 $500 | 500 | 29-Apr-98 | 3.9233 | 154.10 |
| 16 | 25140846 | GMAC/6.375/08 $500 | 500 | 29-Apr-98 | 3.9233 | 154.10 |
| 17 | 27000474 | GMAC/5.85/09 $1000 | 1000 | 14-Jan-99 | 3.2115 | 381.57 |
| 18 | 27009900 | GMAC/7.75/10 $2500 | 2500 | 19-Jan-00 | 2.1985 | 1,292.71 |
| 19 | 27026240 | GMAC/7.5/05 $2000 | 2000 | 14-Jil-00 | 1.7139 | 1,196.00 |
| 20 | 27050415 | GMAC/6.75/06 $4250 | 4250 | 11-Jan-01 | 1.1700 | 2,991.91 |
| 21 | 2705416 | GMAC/7.2/11 $1500 | 1500 | 11-Jan-01 | 1.2019 | 1,045.91 |
| 22 | 27055719 | GMAC/6.125/06 $2500 | 2500 | 12-Sep-01 | 0.5503 | 2,119.54 |
| 23 | 27055721 | *GMAC/6.875/11 $5500 | 5500 | 12-Sep-01 | 0.4995 | 4,734.56 |
| 24 | 27056333 | GMAC/6.85/08 $750 | 750 | 15-Oct-01 | 1.4600 | 853.33 |
| 25 | 27056637 | GM/8.0/31 $4000 | 4000 | 02-Nov-01 | 0.4107 | 3,536.34 |
| 26 | 27058134 | GMAC/7.0/12 $1000 | 1000 | 01-Feb-02 | 0.1615 | 952.70 |
| 27 | 27058151 | GMAC/6.125/07 $1000 | 1000 | 01-Feb-02 | 0.1615 | 952.70 |
| 28 | 300234779 | GMAC/7.25/11 $2000 | 2000 | 02-Mar-01 | 1.0815 | 1,445.87 |
| 29 | | | | | | |
| 30 | | | | | | 22,009.70 |
| 31 | | | | | | |

|   | A | B | C | D | E | F |
|---|---|---|---|---|---|---|
| 1 |  |  |  |  |  |  |
| 2 | Step 1: Rank order all issuers and assign composite premium values to each. |  |  |  |  |  |
| 3 |  |  |  |  |  |  |
| 4 | Rank | Name | Decayed Debt. | Model prem. |  |  |
| 5 | 1 | Ford Motors | 25,293.1 | 12 |  |  |
| 6 | 2 | General Motors | 22,009.7 | 10.442 |  |  |
| 7 | 3 | Citigroup | 15,083.8 | 7.158 |  |  |
| 8 | 4 | Household Finance | 9,973.5 | 4.732 |  |  |
| 9 | 5 | WorldCom | 8,788.6 | 4.169 |  |  |
| 10 | 6 | DaimierChrysler | 7,815.2 | 3.708 |  |  |
| 11 | 7 | Bank of America | 6,756.4 | 3.205 |  |  |
| 12 | 8 | Credit Suisse | 6,369.1 | 3.022 |  |  |
| 13 | 9 | British Tolecom | 6,257.9 | 2.969 |  |  |
| 14 | 10 | Wells Fargo | 5,983.9 | 2.839 |  |  |
| 15 | 11 | Verizon | 5,961.0 | 2.825 |  |  |
| 16 | 12 | Qwest US-West | 5,857.0 | 2.779 |  |  |
| 17 | 13 | France Telecom | 5,840.8 | 2.771 |  |  |
| 18 | 14 | Banc One | 5,732.4 | 2.720 |  |  |
| 19 | 15 | JPMorgan Chase | 5,679.0 | 2.594 |  |  |
| 20 | 16 | Deutsche Telekom | 5,643.8 | 2.576 |  |  |
| 21 | 17 | AT&T Wireless | 4,714.5 | 2.237 |  |  |
| 22 | 18 | Sprint | 4,685.7 | 2.223 |  |  |
| 23 | 19 | Lehman Bros | 4,561.9 | 2.164 |  |  |
| 24 | 20 | GE Capital | 4,409.3 | 2.092 |  |  |
| 25 | 21 | Morgan Stanley | 4,383.6 | 2.080 |  |  |
| 26 | 22 | Bristol-Myers Squibb | 4,295.2 | 2.038 |  |  |
| 27 | 23 | Conoco | 4,133.0 | 1.961 |  |  |
| 28 | 24 | Tyco | 4,029.4 | 1.912 |  |  |
| 29 | 25 | Wal-Mart | 3,846.9 | 1.825 |  |  |
| 30 | 26 | Bell South | 3,632.3 | 1.723 |  |  |
| 31 | 27 | Devon Financing | 3,582.0 | 1.699 |  |  |
| 32 | 28 | First Energy | 3,574.3 | 1.696 |  |  |
| 33 | 29 | Kraft Foods | 3,536.3 | 1.678 |  |  |
| 34 | 30 | Target | 3,480.2 | 1.651 |  |  |
| 35 | 31 | Comcast | 3,435.6 | 1.630 |  |  |
| 36 | 32 | General Mills | 3,389.7 | 1.608 |  |  |
| 37 | 33 | Viacom | 3,381.2 | 1.604 |  |  |
| 38 | 34 | AOL Time Warner | 3,279.6 | 1.556 |  |  |
| 39 | 35 | Alcos | 2,970.5 | 1.409 |  |  |
| 40 | 36 | Citizens Comm | 2,750.7 | 1.305 |  |  |
| 41 | 37 | Kellogg | 2,680.9 | 1.262 |  |  |
| 42 | 38 | Hess. Amerada | 2,574.6 | 1.221 |  |  |
| 43 | 39 | Telus | 2,588.8 | 1.218 |  |  |
| 44 | 40 | Washington Mutual | 2,449.4 | 1.152 |  |  |
| 45 | 41 | AT&T | 2,426.9 | 1.151 |  |  |
| 46 | 42 | Telefonics | 2,373.3 | 1.126 |  |  |
| 47 | 43 | Motorola | 2,310.3 | 1.098 |  |  |
| 48 | 44 | KPN | 2,238.8 | 1.062 |  |  |
| 49 | 45 | EOP Operating | 2,236.2 | 1.061 |  |  |

|    | A | B | C | D | E | F |
|----|---|---|---|---|---|---|
| 1  | Step 1: Rank order all issuers and assign composite premium values to each. | | | | | |
| 2  | | | | | | |
| 3  | | | | | | |
| 4  | Rank | Name | Decayed Debt. | Model prem. | | |
| 5  | 1 | Ford Motors | 25293.74379 | =C5/$C$5*12 | | |
| 6  | 2 | General Motors | 22009.69066 | =C6/$C$5*12 | | |
| 7  | 3 | Citigroup | 15083.799257 | =C7/$C$5*12 | | |
| 8  | 4 | Household Finance | 9973.467967 | =C8/$C$5*12 | | |
| 9  | 5 | WorldCom | 8786.611333 | =C9/$C$5*12 | | |
| 10 | 6 | DaimlerChrysler | 7815.202129 | =C10/$C$5*12 | | |
| 11 | 7 | Bank of America | 6756.425406 | =C11/$C$5*12 | | |
| 12 | 8 | Credit Suisse | 6369.136357 | =C12/$C$5*12 | | |
| 13 | 9 | British Telecom | 6257.654778 | =C13/$C$5*12 | | |
| 14 | 10 | Wells Fargo | 5983.897142 | =C14/$C$5*12 | | |
| 15 | 11 | Verizon | 5981.031888 | =C15/$C$5*12 | | |
| 16 | 12 | Qwest US-West | 5858.985105 | =C16/$C$5*12 | | |
| 17 | 13 | France Telecom | 5740.770609 | =C17/$C$5*12 | | |
| 18 | 14 | Banc One | 5732.440728 | =C18/$C$5*12 | | |
| 19 | 15 | JPMorgan Chase | 5679.00873 | =C19/$C$5*12 | | |
| 20 | 16 | Deutsche Telekom | 5643.77235199999 | =C20/$C$5*12 | | |
| 21 | 17 | AT&T Wireless | 4714.545311 | =C21/$C$5*12 | | |
| 22 | 18 | Sprint | 4685.737027 | =C22/$C$5*12 | | |
| 23 | 19 | Lehman Bros | 4581.879467 | =C23/$C$5*12 | | |
| 24 | 20 | GE Capital | 4409.328553 | =C24/$C$5*12 | | |
| 25 | 21 | Morgan Stanley | 4383.839864 | =C25/$C$5*12 | | |
| 26 | 22 | Bristol-Myers Squibb | 4295.153579 | =C26/$C$5*12 | | |
| 27 | 23 | Conoco | 4133.013533 | =C27/$C$5*12 | | |
| 28 | 24 | Tyco | 4029.358517 | =C28/$C$5*12 | | |
| 29 | 25 | Wal-Mart | 3846.91768 | =C29/$C$5*12 | | |
| 30 | 26 | Bell South | 3832.262765 | =C30/$C$5*12 | | |
| 31 | 27 | Devon Financing | 3581.964548 | =C31/$C$5*12 | | |
| 32 | 28 | First Energy | 3574.298243 | =C32/$C$5*12 | | |
| 33 | 29 | Kraft Foods | 3538.336347 | =C33/$C$5*12 | | |
| 34 | 30 | Target | 3480.204047 | =C34/$C$5*12 | | |
| 35 | 31 | Comcast | 3435.626275 | =C35/$C$5*12 | | |
| 36 | 32 | General Mills | 3389.661855 | =C36/$C$5*12 | | |
| 37 | 33 | Viacom | 3381.214358 | =C37/$C$5*12 | | |
| 38 | 34 | AOL Time Warner | 3279.596432 | =C38/$C$5*12 | | |
| 39 | 35 | Alcos | 2970.503941 | =C39/$C$5*12 | | |
| 40 | 36 | Citizens Comm | 2750.885591 | =C40/$C$5*12 | | |
| 41 | 37 | Kellogg | 2660.928582 | =C41/$C$5*12 | | |
| 42 | 38 | Hess. Amerada | 2574.61139 | =C42/$C$5*12 | | |
| 43 | 39 | Telus | 2566.814893 | =C43/$C$5*12 | | |
| 44 | 40 | Washington Mutual | 2449.398384 | =C44/$C$5*12 | | |
| 45 | 41 | AT&T | 2428.92778 | =C45/$C$5*12 | | |
| 46 | 42 | Telefonics | 2373.252174 | =C46/$C$5*12 | | |
| 47 | 43 | Motorola | 2310.285922 | =C47/$C$5*12 | | |
| 48 | 44 | KPN | 2238.813344 | =C48/$C$5*12 | | |
| 49 | 45 | EOP Operating | 2238.158572 | =C49/$C$5*12 | | |

| | H | I | J | K | L | M |
|---|---|---|---|---|---|---|
| 7 | | | | | | |
| 8 | Where do the Decayed Debt numbers come from? | | | | | |
| 9 | Sample: General Motors | | | | | |
| 10 | | | | | | 37347 |
| 11 | | | | | | |
| 12 | Seed | Credit | Size | Issue Dt. | Age | Decayed Size |
| 13 | 25139619 | GMAC/6.125/08 $750 | 750 | 35817 | =($M$10-K13)/385.25 | =J13*EXP(-0.3*L13) |
| 14 | 25140713 | GMAC/6.75/28 $600 | 800 | 35914 | =($M$10-K14)/385.25 | =J14*EXP(-0.3*L14) |
| 15 | 25140839 | GMAC/6.25/05 $500 | 500 | 35914 | =($M$10-K15)/385.25 | =J15*EXP(-0.3*L15) |
| 16 | 25140846 | GMAC/6.375/08 $500 | 500 | 35914 | =($M$10-K16)/385.25 | =J16*EXP(-0.3*L16) |
| 17 | 27000474 | GMAC/5.85/09 $1000 | 1000 | 38174 | =($M$10-K17)/385.25 | =J17*EXP(-0.3*L17) |
| 18 | 27009900 | GMAC/7.75/10 $2500 | 2500 | 38544 | =($M$10-K18)/385.25 | =J18*EXP(-0.3*L18) |
| 19 | 27026240 | GMAC/7.5/05 $2000 | 2000 | 38721 | =($M$10-K19)/385.25 | =J19*EXP(-0.3*L19) |
| 20 | 27050415 | GMAC/6.75/06 $4250 | 4250 | 36902 | 1.1700285638322 | =J20*EXP(-0.3*L20) |
| 21 | 27050416 | GMAC/7.2/11 $1500 | 1500 | 36902 | 1.201913495555099 | =J21*EXP(-0.3*L21) |
| 22 | 27055719 | GMAC/6.125/06 $2500 | 2500 | 37146 | =($M$10-K22)/385.25 | =J22*EXP(-0.3*L22) |
| 23 | 27055721 | *GMAC/6.875/11 $5500 | 5500 | 37146 | 0.499533320888557 | =J23*EXP(-0.3*L23) |
| 24 | 27056333 | GMAC/6.85/08 $750 | 750 | 37179 | =($M$10-K24)/385.25 | =J24*EXP(-0.3*L24) |
| 25 | 27056637 | GM/8.0/31 $4000 | 4000 | 37197 | =($M$10-K25)/385.25 | =J25*EXP(-0.3*L25) |
| 26 | 27058134 | GMAC/7.0/12 $1000 | 1000 | 37288 | =($M$10-K26)/385.25 | =J26*EXP(-0.3*L26) |
| 27 | 27058151 | GMAC/6.125/07 $1000 | 1000 | 37288 | =($M$10-K27)/385.25 | =J27*EXP(-0.3*L27) |
| 28 | 300234779 | GMAC/7.25/11 $2000 | 2000 | 38952 | =($M$10-K28)/385.25 | =J28*EXP(-0.3*L28) |
| 29 | | | | | | |
| 30 | | | | | | =J30*EXP(-0.3*L30) |
| 31 | | | | | | |

FIG. 3B

|    | H | I | J | K | L |
|----|---|---|---|---|---|
| 32 | 3 of the GMAC bonds had add-ons which affected age: | | | | |
| 33 | | | | | |
| 34 | Seed | Date | Size Change | Term | % Size |
| 35 | 27050415 | 11-Jan-01 | 2,750,000,000 | 1.2183 | 0.6471 |
| 36 | 27050415 | 02-Mar-01 | 1,500,000,000 | 1.0815 | 0.3529 |
| 37 | | | 4,250,000,000 | 1.1700 | |
| 38 | | | | | |
| 39 | Seed | Date | Size Change | Term | % Size |
| 40 | 27050418 | 11-Jan-01 | 1,000,000,000 | 1.2183 | 0.6667 |
| 41 | 27050418 | 29-Jan-01 | 500,000,000 | 1.1691 | 0.3333 |
| 42 | | | 1,500,000,000 | 1.2819 | |
| 43 | | | | | |
| 44 | Seed | Date | Size Change | Term | % Size |
| 45 | 27055721 | 12-Sep-01 | 3,500,000,000 | 0.5503 | 0.6364 |
| 46 | 27055721 | 02-Nov-01 | 32,000,000,000 | 0.4107 | 0.3636 |
| 47 | | | 5,500,000,000 | 0.4995 | |

FIG. 4A

|    | H | I | J | K | L |
|----|---|---|---|---|---|
| 32 | 3 of the GMAC bonds had add-ons which affected age: | | | | |
| 33 | | | | | |
| 34 | Seed | Date | Size Change | Term | % Size |
| 35 | 27050415 | 36902 | 2750000000 | =($M$10-I35)/365.25 | =J35/$J$37 |
| 36 | 27050415 | 36952 | 150000000 | =($M$10-I36)/365.25 | =J36/$J$37 |
| 37 | | | =SUM(J35:J36) | =SUMPRODUCT(K16:K26,L36:L38) | |
| 38 | | | | | |
| 39 | Seed | Date | Size Change | Term | % Size |
| 40 | 27050416 | 36902 | 1000000000 | =($M$10-I140)365.25 | =J40/$J$42 |
| 41 | 27051416 | 36920 | 500000000 | =($M$10-I141)/365.25 | =J41/$J$42 |
| 42 | | | =SUM(J40:J41) | =SUMPRODUCT(K40:K11,L40:L41) | |
| 43 | | | | | |
| 44 | Seed | Date | Size Change | Term | % Size |
| 45 | 27055721 | 37146 | 3500000000 | =($M$10-I145)365.25 | =J45/$J$47 |
| 46 | 27055721 | 37197 | 2000000000 | =($M$10-I146)/365.25 | =J46/$J$47 |
| 47 | | | =SUM(J45:J46) | =SUMPRODUCT(K45:K48,L45:L46) | |

| | A | B | C | D | E | F | G | H | I | J |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| 5 | | Step 2: Assign specific premiums to each bond from each issuer based on the % of each | | | | | | | | |
| 6 | | bond's new score relative to the top-scoring bond from each issuer. | | | | | | | | |
| 7 | | | | | | | | | | |
| 8 | | | | | | | | | | |
| 9 | | Example of an Issuer covered in step 2. This step performs this same process for each issuer. | | | | | | | | |
| 10 | | | | | | | Applied Iss. Prem. | | | |
| 11 | | (all 3 bonds were issued March 6, 2001) | | | | | | | | |
| 12 | | identifier | age | size | Rate | incum5 Prem. | Issue Prem. | Ltd.Score | | |
| 13 | | AWE/7.35/06 $1000 | 1.070499 | 1000 | 4.15117 | 1.74076 | 1.41935 | 7.31127 | | |
| 14 | | *AWE/7.875/11 $3000 | 1.070499 | 3000 | 6.54169 | 4.35189 | 2.23670 | 13.13028 | | |
| 15 | | AWE/8.75/31 $2500 | 1.070499 | 2500 | 6.14497 | 1.74076 | 2.10106 | 9.98678 | | |
| 16 | | | | MAX: | 6.54169 | | | | | |
| 17 | | | | | Rate | incum5 Prem. | Issue Prem. | Ltd.Score | | CHECK |
| 18 | | The above table was generated by the system | AWE/7.35/06 $1000 | | 4.15117 | 1.74076 | 1.41935 | 7.31127 | | 0.000000000 |
| 19 | | The panel to the right recreates each | *AWE/7.875/11 $3000 | | 6.54169 | 4.35189 | 2.23670 | 13.13028 | | 0.000000000 |
| 20 | | number manually. | AWE/8.75/31 $2500 | | 6.14497 | 1.74078 | 2.10106 | 9.98678 | | 0.000000000 |
| 21 | | | | | | | | | | 0.000000000 |
| 22 | | | | | | | | | | |
| 23 | | | | | | The Incumbent bond | | | | |
| 24 | | | | | | gets the full | | | | |
| 25 | | | | | | Incumbency | | | | |
| 26 | | | | | | premium of | | | | |
| 27 | | | | | | 4.35189. The | | | | |
| 28 | | | | | | other bonds from | | | | |
| 29 | | | | | | this issuer | | | | |
| 30 | | | | | | get 0.4* that | | | | |
| 31 | | | | | | value. | | | | |
| 32 | | | | | | | | | | |

|   | A | B | C |
|---|---|---|---|
| 1 |   |   |   |
| 2 |   |   |   |
| 3 |   |   |   |
| 4 |   |   |   |
| 5 |   | Step 2: Assign specific premiums to each bond from each issuer based on the % of each |   |
| 6 |   | bond's raw score relative to the top-scoring bond from each issuer. |   |
| 7 |   |   |   |
| 8 |   |   |   |
| 9 |   | Example of one issuer covered in step 2. This step performs this same process for each issuer. |   |
| 10 |   |   |   |
| 11 |   |   | (all 3 bonds were issued March 6, 2001) |
| 12 |   | identifier | age |
| 13 |   | AWE/7.35/06 $1000 | 1.070499 |
| 14 |   | *AWE/7.875/11 $3000 | 1.070499 |
| 15 |   | AWE/8.75/31 $2500 | 1.070499 |
| 16 |   |   |   |
| 17 |   |   |   |
| 18 |   | The above table was generated by the system. |   |
| 19 |   | The panel to the right recreates each |   |
| 20 |   | number manually. |   |
| 21 |   |   |   |
| 22 |   |   |   |
| 23 |   |   |   |
| 24 |   |   |   |
| 25 |   |   |   |
| 26 |   |   |   |
| 27 |   |   |   |
| 28 |   |   |   |
| 29 |   |   |   |
| 30 |   |   |   |
| 31 |   |   |   |
| 32 |   |   |   |

FIG. 5B

|   | D | E | F |
|---|---|---|---|
| 1 | | | |
| 2 | | | |
| 3 | | | |
| 4 | | | |
| 5 | | | |
| 6 | | | |
| 7 | | | |
| 8 | | | |
| 9 | | | |
| 10 | | | |
| 11 | | | |
| 12 | size | Raw | Incum. Prem. |
| 13 | 1000 | 4.151116863325772 | 1.74075519181791 |
| 14 | 3000 | 6.54166743987519 | 4.35188797954478 |
| 15 | 2500 | 6.14496594416343 | 1.74075519181791 |
| 16 | | | |
| 17 | | Raw | Incum. Prem. |
| 18 | AWE/7.35/06 $1000 | =EXP(-0.3*C13)*MAX(0.3*LN(O13)-15) | =F19*0.4 |
| 19 | *AWE/7.875/11 $3000 | =EXP(-0.3*C14)*MAX(0.3*LN(O14)-15) | =6*EXP(-0.3*C14) |
| 20 | AWE/8.75/31 $2500 | =EXP(-0.3*C15)*MAX(0.3*LN(O15)-15) | =F19*0.4 |
| 21 | MAX: | =MAX(E18:E20) | |
| 22 | | | |
| 23 | | | |
| 24 | | | The incumbent bond |
| 25 | | | gets the full |
| 26 | | | incumbency |
| 27 | | | premium of |
| 28 | | | 4.35189. The |
| 29 | | | other bonds from |
| 30 | | | this issuer |
| 31 | | | get 0.4 * that |
| 32 | | | value. |

|   | G | H | I | J |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | Applied Iss. Prem. | | | |
| 11 | | | | |
| 12 | Issuer Prem. | Lq Score | | |
| 13 | 1.419346827321 | 7.31127065239663 | | |
| 14 | 2.23670106743553 | 13.1302764868655 | | |
| 15 | 2.10105603683926 | 9.98677717282061 | | |
| 16 | | | | |
| 17 | Issuer Prem. | Lq Score | | CHECK |
| 18 | =E18/$21*Issuer Premium'!$O$21 | =SUM(E18:G18) | | =H13-H18 |
| 19 | =E19/$21*Issuer Premium'!$O$21 | =SUM(E19:G19) | | =H14-H19 |
| 20 | =E20/$21*Issuer Premium'!$O$21 | =SUM(E20:G20) | | =H15-H20 |
| 21 | | | | =SUM(J18:J20) |
| 22 | | | | |
| 23 | | | | |
| 24 | | | | |
| 25 | | | | |
| 26 | | | | |
| 27 | | | | |
| 28 | | | | |
| 29 | | | | |
| 30 | | | | |
| 31 | | | | |
| 32 | | | | |

|   | D | E | F | G | H |
|---|---|---|---|---|---|
| 6 | FACE | SIZE | PV | MKT SIZE | |
| 7 | 500 | 1 | 102.5 | 102.5 | 20.34% |
| 8 | 900 | 1 | 100 | 100 | 19.85% |
| 9 | 2500 | 1 | 99.4 | 99.4 | 19.73% |
| 10 | 1000 | 1 | 97.4 | 97.4 | 19.33% |
| 11 | 4800 | 1 | 104.56 | 104.56 | 20.75% |
| 12 | | | | | |
| 13 | | | | 503.86 | |

FIG. 6A

|    | D    | E    | F      | G           | H           |
|----|------|------|--------|-------------|-------------|
| 6  | FACE | SIZE | PV     | MKT SIZE    |             |
| 7  | 500  | 1    | 102.5  | =F7*E7      | =G7/$G$13   |
| 8  | 900  | 1    | 100    | =F8*E8      | =G8/$G$13   |
| 9  | 2500 | 1    | 99.4   | =F9*E9      | =G9/$G$13   |
| 10 | 1000 | 1    | 97.4   | =F10*E10    | =G10/$G$13  |
| 11 | 4800 | 1    | 104.56 | =F11*E11    | =G11/$G$13  |
| 12 |      |      |        |             |             |
| 13 |      |      |        | =SUM(G7:G11)|             |

FIG. 6B

|    | D    | E    | F      | G        | H      | I | J        | K      | L |
|----|------|------|--------|----------|--------|---|----------|--------|---|
|    |      |      |        |          |        |   | Pure Market Weighting | | |
| 6  | FACE | SIZE | PV     | MKT SIZE |        |   |          |        |   |
| 7  | 500  | 1    | 102.5  | 102.5    | 20.34% |   | 51250    | 5.2%   |   |
| 8  | 900  | 1    | 100    | 100      | 19.85% |   | 90000    | 9.1%   |   |
| 9  | 2500 | 1    | 99.4   | 99.4     | 19.73% |   | 248500   | 25.1%  |   |
| 10 | 1000 | 1    | 97.4   | 97.4     | 19.33% |   | 97400    | 9.8%   |   |
| 11 | 4800 | 1    | 104.56 | 104.56   | 20.75% |   | 501888   | 50.7%  |   |
| 12 |      |      |        |          |        |   |          |        |   |
| 13 |      |      |        | 503.86   |        |   | 989038   |        |   |

FIG. 7A

|    | D    | E    | F      | G           | H          | I | J           | K          |
|----|------|------|--------|-------------|------------|---|-------------|------------|
|    |      |      |        |             |            |   | Pure Market Weighting | |
| 6  | FACE | SIZE | PV     | MKT SIZE    |            |   |             |            |
| 7  | 500  | 1    | 102.5  | =F7*E7      | =G7/$G$13  |   | =F7*E7      | =J7/$J$13  |
| 8  | 900  | 1    | 100    | =F8*E8      | =G8/$G$13  |   | =F8*E8      | =J8/$J$13  |
| 9  | 2500 | 1    | 99.4   | =F9*E9      | =G9/$G$13  |   | =F9*E9      | =J9/$J$13  |
| 10 | 1000 | 1    | 97.4   | =F10*E10    | =G10/$G$13 |   | =F10*E10    | =J10/$J$13 |
| 11 | 4800 | 1    | 104.56 | =F11*E11    | =G11/$G$13 |   | =F11*E11    | =J11/$J$13 |
| 12 |      |      |        |             |            |   |             |            |
| 13 |      |      |        | =SUM(G7:G11)|            |   | =SUM(J7:J12)|            |

FIG. 7B

| | B | C | D | E | F | G | H | I | J | K | L | M | N | O | P |
|---|---|---|---|---|---|---|---|---|---|---|---|---|---|---|---|
| 4 | Reference Profiles | | | | | | | | | | | | | | |
| 5 | (Generated each November, except for 1998 which is generated Jan 1, 1999) | | | | | | | | | | | | | | |
| 6 | | | | | | | | | | | | | | | |
| 7 | | | | | | | | | | | | | | | |
| 8 | | | | | | 1998 | | | 1999 | | | 2000 | | | 2001 | |
| 9 | Call | Sector | Maturity | | Broad's Par | Top # | | Broad's Par | Top # | | Broad's Par | Top # | | Broad's Par | Top # |
| 10 | Composite | | | | 141,868 | 100 | | 242,363 | 100 | | 341,393 | 100 | | 514,178 | 100 |
| 11 | 1 | Consumer | 5 | | 27,063 | 19 | | 38,211 | 15 | | 51,700 | 15 | | 69,250 | 14 |
| 12 | 2 | Finance | 5 | | 22,650 | 16 | | 45,825 | 19 | | 68,750 | 20 | | 79,425 | 15 |
| 13 | 3 | Tele/Tech | 5 | | 7,200 | 5 | | 12,550 | 5 | | 16,725 | 5 | | 31,175 | 6 |
| 14 | 4 | Indus/Util | 5 | | 9,150 | 6 | | 11,500 | 5 | | 21,500 | 6 | | 33,040 | 7 |
| 15 | 5 | Consumer | 10 | | 10,146 | 7 | | 28,848 | 12 | | 35,800 | 10 | | 71,680 | 14 |
| 16 | 6 | Finance | 10 | | 14,200 | 10 | | 23,000 | 10 | | 34,650 | 10 | | 58,375 | 11 |
| 17 | 7 | Tele/Tech | 10 | | 9,250 | 7 | | 13,600 | 6 | | 20,700 | 6 | | 42,850 | 8 |
| 18 | 8 | Indus/Util | 10 | | 5,500 | 4 | | 10,875 | 4 | | 18,775 | 8 | | 41,425 | 8 |
| 19 | 9 | Consumer | 30 | | 15,007 | 11 | | 24,432 | 10 | | 27,982 | 9 | | 29,601 | 6 |
| 20 | 10 | Finance | 30 | | 5,600 | 4 | | 8,400 | 3 | | 7,900 | 2 | | 8,550 | 2 |
| 21 | 11 | Tele/Tech | 30 | | 11,300 | 8 | | 17,410 | 7 | | 21,480 | 6 | | 27,850 | 5 |
| 22 | 12 | Indus/Util | 30 | | 4,800 | 3 | | 9,900 | 4 | | 15,450 | 5 | | 20,955 | 4 |

FIG. 10A $$\text{Adjusted Total Return of Index} = \text{Index End}/(\text{Index Begin} * \text{Factor}) - 1$$

CREDIT INDEX, A SYSTEM AND METHOD FOR STRUCTURING A CREDIT INDEX, AND A SYSTEM AND METHOD FOR OPERATING A CREDIT INDEX

RELATED APPLICATIONS

This application claims the benefit under 35 U.S.C. 119(e) of U.S. Provisional Application Ser. No. 60/295,856, filed Jun. 5, 2001; U.S. Provisional application Ser. No. 60/302,275, filed Jun. 29, 2001; U.S. Provisional application Ser. No. 60/355,653, filed Feb. 7, 2002; U.S. Provisional application Ser. No. 60/356,080, filed Feb. 11, 2002; and U.S. Provisional application Ser. No. 60/356,957, filed Feb. 14, 2002.

FIELD OF THE INVENTION

The present invention relates to a credit index, a system and method for structuring a credit index, a system and method for operating a credit index, and a system and method for determining the liquidity of a credit.

BACKGROUND OF THE INVENTION

Various mechanisms exist for tracking a broad market using a subset of the available financial instruments. Such mechanisms include "indexes" (i.e., dynamic subsets) of the financial instruments and "baskets" (i.e., static subsets) of the financial instruments. The markets may typically include capital markets (wherein the market is tracked using an index of stocks, for example) and credit markets (wherein the market is tracked using an index of bonds, for example). For the purposes of the present application, the term "credit" is intended to include, but not be limited to, a bond, a bank loan, and/or a credit derivative (e.g., a swap).

For example, a number of conventional stock indices exist (e.g., the S&P 500, the Russell 2000, and the Russell 1000) which include a subset of stocks chosen to track a relatively large universe of stocks (e.g., small cap stocks, mid cap stocks, or large cap stocks). These conventional stock indices are typically priced on a continuous basis. More particularly, such conventional stock indices are typically priced on a real time or quasi-real time basis.

Further, there exist conventional credit indices that include a subset of credits chosen to track a relatively large universe of credits. Such a relatively large universe of credits may comprise all investment grade credits in a given market or all high yield credits in a given market, for example. These conventional credit indices are typically priced either: 1) once per month; or 2) more frequently using "matrix pricing" (wherein the pricing is carried out using a derived pricing mechanism). While the timeliness of the pricing may be improved by including fewer credits in the index (thus enabling more frequent pricing using more up-to-date data), the accuracy of the tracking of the broad market by the conventional credit index has traditionally suffered (i.e., as fewer credits are included in the index the tracking error has traditionally increased). Further still, some these conventional credit indices are not typically readily tradable in a widespread (e.g., public) market, at least in part because the underlying credits are not typically "liquid".

BRIEF DESCRIPTION OF THE DRAWINGS

FIG. 2A shows a spreadsheet depicting various calculations according to an embodiment of the present invention;

FIG. 2B shows various formulas utilized in the spreadsheet of FIG. 2A;

FIG. 3B shows various formulas utilized in the spreadsheet of FIG. 3A;

FIG. 4A shows a spreadsheet depicting various calculations according to an embodiment of the present invention;

FIG. 4B shows various formulas utilized in the spreadsheet of FIG. 4A;

FIG. 5A shows a spreadsheet depicting various calculations according to an embodiment of the present invention;

FIGS. 5B, 5C, and 5D show various formulas utilized in the spreadsheet of FIG. 5A;

FIG. 6A shows a spreadsheet depicting various calculations according to an embodiment of the present invention;

FIG. 6B shows various formulas utilized in the spreadsheet of FIG. 6A;

FIG. 7A shows a spreadsheet depicting various calculations according to an embodiment of the present invention;

FIG. 7B shows various formulas utilized in the spreadsheet of FIG. 7A;

FIG. 10A shows a spreadsheet depicting an example Reference Profile associated with an embodiment of the present invention;

Figures 1, 3A:
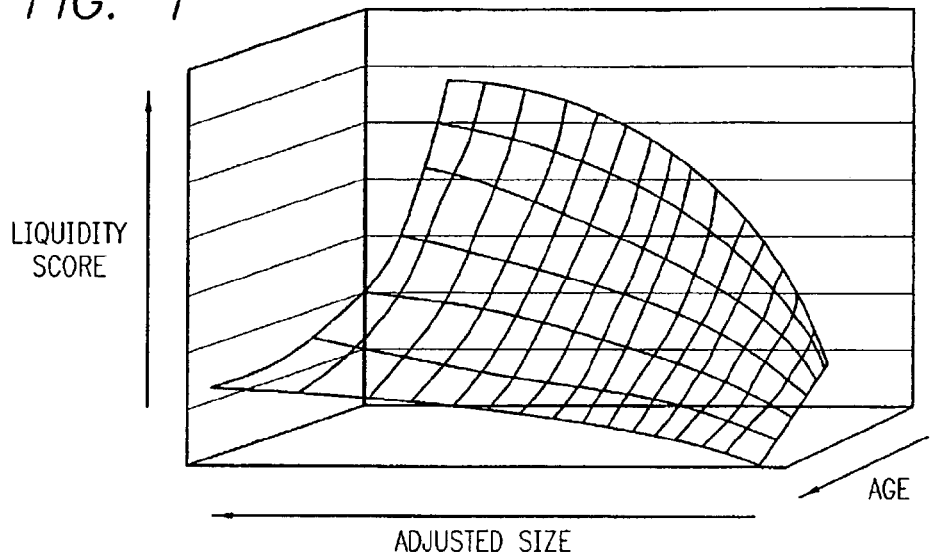
FIG. 1 shows a mechanism for determining a Liquidity Score according to an embodiment of the present invention.
FIG. 3A shows a spreadsheet depicting various calculations according to an embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale; some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment, a "Liquidity Score" according to the present invention may be utilized to objectively measure the expected liquidity of a given bond (e.g., a bond in an index, a bond being considered for inclusion in an index, or any other desired bond). Such a Liquidity Score may, in general, approximate the ease of transaction execution associated with the bond. In practice, such a Liquidity Score may comprise a number produced at least in part by mapping key variables against one another (e.g., via a continuous function).

More particularly, in one example (which example is intended to be illustrative and not restrictive), a bond's Liquidity Score may be calculated using parameters including, but not limited to: a credit's size; the total issuance size of all credits of the issuer in an index; the age of the credit; the amount of equity that the issuer has available; the profile of the debt (e.g. maturity, currency, subordination); the number of underwriters involved in the credit transaction; and/or the credit's sector categorization (e.g., industry sector (such as financial, non-financial, telecommunications, energy, etc.) and/or rating sector (such as AAA, BB, etc.)). In one specific example shown in FIG. 1 (which example is intended to be illustrative and not restrictive), the higher the credit's size and the issuer's outstanding amounts, and the lower the credit's age, the higher the Liquidity Score.

In another specific example (which example is intended to be illustrative and not restrictive), the Liquidity Score may take into account: 1) the bid/offer on the credit (e.g. the size of the difference between the bid and offer); 2) the "depth" of a market (i.e., how much can the market absorb without a significant price increase); 3) the size of a given credit transaction; and/or 4) the timeliness of the availability of a credit.

In another specific example (which example is intended to be illustrative and not restrictive), the Liquidity Score may typically take into account: 1) the bid/offer on the credit (e.g. the size of the difference between the bid and offer); and 2) the timeliness of the availability of a credit, wherein the Liquidity Score may conditionally take into account (in cases where an execution is large enough to pose a potential problem (e.g., to affect liquidity)) the "depth" of a market (i.e., how much can the market absorb without a significant price increase) and/or the size of a given credit transaction.

In another embodiment of the present invention, a liquid bond index may be provided. In this regard, while the liquid index of this embodiment is described below with reference to various specifics (including, for example, but not limited to: the number of bonds in the broad index and in the liquid index, the various disqualification parameters, the various formulas (e.g., the various functions and constants), the Market Profile, etc.), it is noted that such specifics are provided as examples, and that these examples are intended to be illustrative and not restrictive. For example, the "Broad Index Composition" parameter and the "Disqualification" parameter can be combined into one general parameter with subparts. As well, these parameters can be combined with the "Liquidity Score" parameter into one general parameter with subparts. Moreover, one or more the following listed subparts of each general parameter can be used to define the general parameter (e.g. not every subpart is required to define the general parameter). For example, in another embodiment, the "Liquidity Score" parameter can be composed only of the "incumbency premium." In yet another example, the "disqualification" parameter can be composed of the subpart "chronic poor bidding." In yet a further embodiment, the "Broad Index Composition" can be composed of one or more subparts listed below such as "minimum face value" and "certain rating requirements." In any case, the liquid index of this example may use the following bond selection methodology:

Broad Index Composition. From bonds available in the market, select into a broad index (which broad index may be rebalanced periodically (e.g., monthly) to add and/or remove bonds) the bonds which meet the following criteria (such a selection essentially identifies a Qualified Entrant Pool):

Denominated in USD (for a US broad index); denominated in euro, euro-legacy-currency, and/or sterling (for a European broad index).

Minimum face value of $x (e.g., $500 mm) for a US broad index; minimum face value of €y (e.g., €500 million or €500 million equivalent or €200 million or €200 million equivalent or €100 million or €100 million equivalent or £60 million or €60 million equivalent) for a European broad index.

Corporate issuer (no government, sovereign, quasi-sovereign, or government-backed debt).

No more than x time period since issuance (e.g., 5 years).

At least y time period remaining to maturity (e.g., 3 years).

The issuer (or the issuer's guarantor, in the case of a finance subsidiary) must be domiciled (and/or have most of its operations) in certain countries. For example: Andorra, Austria, Belgium, Denmark, Faeroe Islands, Finland, France, Germany, Gibraltar, Greece, Iceland, Ireland, Italy, Liechtenstein, Luxembourg, Malta, Monaco, Netherlands, Norway, Portugal, San Marino, Spain, Sweden, Switzerland, United Kingdom, Vatican City State, United States, Canada, and/or Japan.

Must meet certain rating requirements (e.g.: Must be rated between AAA and BBB- by S&P and/or Aaa and Baa3 by Moody's if rated by both agencies. If rated by only one agency, that rating must be investment grade. In one specific example, if the bond is rated by neither S&P nor Moody's, it is not a candidate. In another specific example, the bond must be rated by both agencies.).

Exclude specific types of bonds (e.g.: i. Split-rated bonds (e.g., BB+ or below or Ba1 or below); ii. Floating rate notes; iii. Callables and Puttables (except for callables at make whole, which may enter); iv. convertibles, preferreds, or bonds with other equity features attached; v. MTNs; vi. Private placements (Rule 144A); vii. Dollar Eurobonds (for US broad index) [Globals may enter]); viii. debt issued by a sponsor and/or administrator of the liquid index (to help eliminate any potential illegal solicitation under any appropriate governmental and/or trading regulations); and/or iix. Yankees (i.e., debt issued by an issuer domiciled outside the U.S. who issues dollar amount debt security and does not issue into the global market (i.e., a market that trades in multiple places).

Include specific types of bonds (e.g.: i. Sinkables; ii. Step-ups; iii. Zeroes (but excluded from the liquid index); iv. Perpetuals).

Disqualification. From the Broad Index Composition, disqualify bonds that meet at least one of the following criteria:

Chronic poor bidding performance. If the bond's spread to the government benchmark (e.g., 10 year treasury) that is bid by a specified trader is x basis points (e.g., 250 basis points) over the average spread for the broad index (e.g. corporate bonds) for y or more business days (e.g, 6 or more business days) over the prior z months (e.g., 2 months), the bond is disqualified from the liquid index for a period of j months (e.g., 6 months). An incumbent bond in the liquid index that meets this chronic poor bidding performance criteria will be removed from the liquid index. Of note, y may be selected so that the test occurs over 2 or more different calendar weeks (to factor out the vacation of a trader, for example); z may be selected so that the test spans a change in months; and j may be selected to allow a bond to "cool-off" such that a market may re-develop for the bond. In general, this test may be used to examine a bond's recent history.

Lockout period. Any bond that falls out of the liquid index, but remains in the broad index, faces a x-month lockout period (e.g., 3 month lockout period) before it can re-enter the liquid index. Of note, x may be selected to allow a bond to "cool-off" such that a market may re-develop for the bond.

Minimum potential run. Any bond that enters the liquid index must have a minimum potential run in the liquid index of at least x months (e.g., 6 months). Thus, in one example there must be at least 3 years and 6 months remaining to maturity when the broad index requirement is at least 3 years remaining to maturity.

Spread Volatility. The x-month (e.g., 3 month) par asset swap spread histories of all bonds in the broad index are scanned. From each bond's spread history, a standard deviation of the daily changes is computed, and the natural logarithm of that value is recorded into a vector. From the vector of such volatilities, a mean ($\mu$) and standard deviation ($\sigma$) are computed. Any bond whose volatility is greater than a specific value, for example, $\mu+2.576\sigma$ (corresponding to a 1% percentile under a normal distribution assumption), is disqualified from candidacy in the liquid index for a period of y months (e.g., 6 months). An incumbent bond in the liquid index that meets this spread volatility criteria will be removed from the liquid index. A bond with fewer than x months (e.g., 3 months) of spread history in the index will automatically test negative (i.e., will not be disqualified for this reason). Of note, this test may be applied in the context of USD, LIBOR, and/or EURO basis points, for example.

Liquidity Score. From the Broad Index Composition, after applying the Disqualification criteria, every bond that is a qualified entrant to the liquid index is assigned a Liquidity Score. This Liquidity Score approximates the ease of transaction execution. The Liquidity Score may be an additive composite of 3 factors:

Raw Score. The raw score 3-D surface is a mathematical function of the age and size of the bond, with parameters constructed by studying actual trading data and overall trader expertise. More particularly, in one example the Raw Score is determined using the formula:

RAW SCORE=max(0, 3×ln(size)−15)×exp(−0.3×avg age)

where avg age is the face-weighted average age of all the add-ons plus the original principal that are part of the total bond (e.g., if a $1 b face bond that is 1 year old had a $1 b add-on 6 months ago, the average age would be 0.75 years), size is the monetary value (in $ millions) of all the add-ons plus the original principal that is part of the total bond, ln is the natural log [i.e., the notation "ln(size)" means "take the natural log of the size"], exp is the base of the natural log [i.e., the notation "exp(−0.3×avg age)" means "raise the value of −0.3 times avg age to the base of the natural log], and the function max(0, 3×ln(size)−15)×exp(−0.3×avg age) sets a floor for the value of RAW SCORE at zero. In another example (which example is intended to be illustrative and not restrictive), the constant 3 may be replaced by any other desired constant (e.g., the constant 1.5), the constant 15 may be replaced by any other desired constant (e.g., the constant 6), and the constant −0.3 may be replaced by any other desired constant. Of note, the Raw Score decays with increasing age (due to the exp function) and increases with increasing size (due to the ln function—which may provide a growth function which provides rapid growth from about 1 billion to about 2 billion dollars and less rapid growth above about 2 billion dollars). In addition, other functions which perform such manipulation may, of course, be used.

Issuer Premium. All issuers are ranked based on age-adjusted total public qualified debt (i.e., all of the debt they have issued that has qualified for the index), where each bond's size is decremented by a decremeting term (e.g., the term exp(−0.3×avg age)). The aggregate age-adjusted debt of every issuer is calculated, the largest one identified ("MAX"), and each issuer is assigned a Model Issuer Premium as follows:

MODEL ISSUER PREMIUM=12×(Issuer aggregate age-adjusted debt/MAX)

Of note, the constant 12 in the formula above is given as an example only, and any other desired constant (e.g., 10) may be used. In addition, the decremeting term exp(−0.3×avg age) is given as an example only, and any other decrementing term using any desired constant(s) and/or function(s) may be used. In any case, for each issuer, the issue with the largest RAW score is awarded the issuer's full Model Issuer Premium and every other issue of the issuer is awarded a fraction of the full Model Issuer Premium ("Applied Issuer Premium") proportionate to the ratio of its RAW score to the largest RAW score of the issuer.

Incumbency Premium. Bonds that were members of the liquid index in at least the prior month are assigned an "Incumbency Premium" to reflect the notion that a new entry candidate would have to outscore an incumbent by a reasonable margin of additional liquidity in order to justify the expense of the trade (and/or to control turnover). In one example (which example is intended to be illustrative and not restrictive), the Incumbency Premium is calculated as follows:

INCUMBENCY PREMIUM=6.0×exp(−0.3×avg age)

In another example (which example is intended to be illustrative and not restrictive), the constant 6 may be replaced by any other desired constant and the constant −0.3 may be replaced by any other desired constant. Of note, the Incumbency Premium decays with increasing age (due to the exp function) and any other functions which perform such manipulation may, of course, be used. Of further note, the Incumbency Premium may be utilized to help achieve an optimum and/or desired balance between turnover (which, in one example, should be minimized), market representation, and tracking error (which, in one example should be minimized). Finally, it is noted that all other bonds from an issuer who has an incumbent bond may also receive a premium equal to (in one example, which example is intended to be illustrative and not restrictive) 2.4×exp(−0.3×avg age). This "intra-issuer incumbency premium" may help to facilitate a move to the on-the-run bond within a large complex of debt from a single issuer.

Market Profile With Periodic (e.g., Annual) Updates. Profile the broad index across industry sector and maturity dimensions by segmenting the bonds into an A×B matrix (e.g., 3×2). For example, the matrix may comprise 3 maturity classes (e.g., 5-10-30 years to maturity) on one axis, and 2 industry sectors (e.g., Financial and Non-financial sectors) on the other axis. Populate each cell in the liquid index with a selected number of bonds, with the number of bonds in the cell (from a total of x bonds comprising the liquid index (e.g., 30 bonds to 100 bonds)) determined by weighting each cell's numerical bond population proportionately to the percent par amount outstanding in the same cell of the broad index. A new market profile may be created periodically (e.g., every November 1—a date roughly corresponding to the end of the underwriting season) and the cell profile of the liquid index may be changed to reflect the broad market changes, if needed.

Selection Process. The x bonds of the liquid index (e.g., the 30 to 100 bonds) are chosen in the following three phases:

Start with the new month's index' initial composition with the incumbent bond set from the prior month. All eligible but non-incumbent bonds are subsequently rank-ordered by Liquidity Score. The universe of non-incumbent bonds that are considered eligible for entry into the index consists of: new issuance during the month, and previously issued bonds in each cell with a Liquidity Score ranking higher than the lowest-scoring incumbent bond in that cell.

Check to see if the cell is accurately populated with the required number of bonds (based on the market profiling described above). If so, go to the next step. If not, remove bonds from the cells with excess bonds by eliminating the bonds with the lowest Liquidity Score and add bonds to the deficient cells by choosing the bonds with the highest Liquidity Score available for the cell from the eligible set. Note that there can be fewer than x number of incumbents (e.g., 30 to 100) at the end of a given period if an incumbent is disqualified due to spread volatility or chronic poor bidding, for example. Conduct this population process by rank ordering cells by average Liquidity Score and favoring the cell with the lowest Liquidity Score first. Repeat the rank ordering for each pass of the populating process (i.e., each pass of one or more iterations).

Examine whether additional swaps of incumbent bonds for non-incumbent bonds will increase the average Liquidity Score of the index and, if so, execute those swaps (subject to any x-issue-per-issuer rule, wherein x is a number such as 1, 2, or 3, for example). Conduct this swap also by rank ordering cells by average Liquidity Score, favoring the cells with the lowest average Liquidity Score on each round (i.e., each pass of one or more iterations). When an incumbent issuer's non-incumbent bond is considered for entry into the index, it must satisfy the following two conditions: 1) it must add to the average Liquidity Score of the cell; and 2) it must add to the average Liquidity Score of the liquid index (i.e., the exiting incumbent bond must be replaced by a non-incumbent bond such that there is a net gain in the average Liquidity Score of the liquid index from the coupled transactions).

Of note, the initial selection process for an index (i.e., where there are no incumbents) is carried out in a similar manner without regard to any incumbent bonds.

Of further note, in another example the selection process described above may be thought of in a simplified manner as consisting of ranking the Liquidity Scores of each bond in each cell and using those bonds (subject to the required number of bonds in each cell) with the highest Liquidity Scores.

Bond Weighting. Every bond in the liquid index may be equally weighted, on a par amount basis, to every other bond in the liquid index. However, as stated in the rules above, by populating the larger market segments with proportionately more bonds, the percent aggregate par value weight of each cell in the liquid index may be broadly proportional to the percentage par value weight of that cell in the broad market. (In another example, every bond in a liquid index cell may be equally weighted, on a par amount basis, to every other bond in that cell (wherein improved market representation may be obtained)).

Although the above-described bond selection methodology (including Broad Index Composition, Disqualification, Liquidity Score, Market Profile With Updates, Selection Process, and Bond Weighting) was illustrated with reference to carrying out the operation in a specific order, any other desired order may, of course, be utilized for operation.

Referring now to FIGS. 2A-7B, various spreadsheets providing additional detail related to the above-described bond selection methodology using example bonds, values, and calculations (which example bonds, values, and calculations are intended to be illustrative and not restrictive) are provided.

More particularly, FIG. 2A shows (in cells A4-D49) a first step in which: (a) various issuers included in a broad index are ranked according to the value of their decayed debt; and (b) each issuer is assigned a Model Premium (note that for the sake of simplicity 45 issuers are depicted in FIG. 2A, although any desired number of issuers may be included in the broad index and/or included in the process depicted in this FIG. 2A). Further, FIG. 2B shows (in cells A4-D49) the formulas utilized in the spreadsheet of FIG. 2A. For example:

Model Premium for Ford Motors=(the Decayed Debt of Ford Motors/the Decayed Debt of Ford Motors [the number 1 ranking issuer])×12).

Model Premium of Wells Fargo=(the Decayed Debt of Wells Fargo/the Decayed Debt of Form Motors [the number 1 ranking issuer])×12).

Still referring to the Decayed Debt of FIGS. 2A and 2B, it is noted that amounts depicted differ slightly due to rounding. In addition, it is noted that FIGS. 3A, 3B, 4A, and 4B provide more detail regarding the calculation of the Decayed Debt of FIGS. 2A and 213.

More particularly, FIG. 3A shows (in cells H12-M30) a detailed calculation example of the Decayed Debt of FIGS. 2A and 2B for one of the issuers (i.e., General Motors). Further, FIG. 3B shows (in cells H12-M30) the formulas utilized in the spreadsheet of FIG. 3A. For example:

Decayed Size (or Decayed Debt) [of each individual credit issue]=Size [of the issue]×exp(−0.3×Age [of the individual credit issue]), wherein the Age equals a current date minus an issue date divided by 365.25

Total Decayed Size (or Total Decayed Debt) [for the issuer]= Sum of Decayed Sizes [of each individual credit]

Still referring to FIGS. 3A and 3B, it is noted that the date values shown in FIG. 3B are intended to correspond to the conventional nomenclature shown in FIG. 3A. In addition, it is noted that FIGS. 4A and 4B provide more detail regarding the calculation of the Age shown in FIGS. 3A and 3B.

More particularly, it is shown in FIG. 4A (in cells H34-L47) how add-ons to three of the General Motors credits shown in FIG. 3A (i.e. cells L20, L21, and L23) affect the Age calculation. This modified Age calculation is shown in detail in FIG. 4B, where it is seen (with reference to the first General Motors credit [i.e., Secid=27050415], for example, that:

Total Size [identified in the Size Change column]=the size of the credit+the size of the add-on
% Size [of the credit or of the add-on]=size of the credit [or of the add-on]/Total Size
Term [of the credit or of the add-on]=(a current date−issue date)/365.25
Term [of the combined credit with add-on; as shown in the Age column in FIG. 3A]=(the term of the credit×the % size of the credit)+(the term of the add-on×the % size of the add-on)

Referring now to FIG. 5A, it is seen that this Fig. shows (in cells B10-H32) the steps for calculating a Liquidity Score for a bond (including the step of assigning specific premiums to each bond from each issuer based on the % of each bond's Raw Score relative to the top scoring bond from each issuer).

More particularly, FIGS. 5B, 5C, and 5D show (in cells B10-H32) the various formulas used in the spreadsheet of FIG. 5A. For example (in connection with three AT&T Wireless bonds):

A Raw Score for each of the three bonds is calculated using the formula: Raw Score=exp(−0.3×the age of the bond))×max(0, 3×ln(the size of the bond)−15))
A Maximum Raw Score selected from the three Raw Scores is determined
The bond with the Maximum Raw Score gets an Incumbency Premium—6×exp(−0.3×the age of the bond).
The remaining bonds (i.e., the bonds that do not have the Maximum Raw Score) get Incumbency Premiums=Maximum Incumbency Premium×0.4
Each bond gets assigned an Applied Issuer Premium as follows: for each issuer, the issue with the largest RAW score is awarded the issuer's full Model Issuer Premium and every other issue of the issuer is awarded a fraction of the full Model Issuer Premium ("Applied Issuer Premium") proportionate to the ratio of its RAW score to the largest RAW score of the issuer. Note that the "'Issuer Premium'!$D$2 1" factor of the spreadsheet of FIG. 5D relates back to the spreadsheet of FIG. 2A.
Each bond is assigned a Liquidity Score=the bond's Raw Score+the bond's Incumbency Premium+the bond's Applied Issuer Premium Referring now to FIG. 6A, a spreadsheet showing the calculation of % weighting of various bonds (i.e., the 5 unnamed bonds in rows 7-11) is provided. More particularly, FIG. 6B shows the formulas used in the spreadsheet of FIG. 6A, including:

Calculating Market Size for each of the bonds as Market Size=Size×Present Value
Calculating Total Market Size of all of the bonds as Total Market Size=the sum of the Market Sizes of each of the bonds
Calculating the % Market Size for each of the bonds as % Market Size Market=Size of each bond/Total Market Size Referring now to FIG. 7A, a spreadsheet showing the calculation of Pure Market Weighting of various bonds (i.e., the 5 unnamed bonds in rows 7-11) is provided. More particularly, FIG. 7B shows the formulas used in the spreadsheet of FIG. 7A, including:

Calculating Market Size for each of the bonds as Market Size=Size×Present Value
Calculating Total Market Size of all of the bonds as Total Market Size=the sum of the Market Sizes of each of the bonds
Calculating the % Market Size for each of the bonds as % Market Size=Market Size of each bond/Total Market Size
Calculating the Market Weighting of each bond as Market Weighting=Face (of each bond)×Present Value (of each bond)
Calculating Total Market Weighting of all of the bonds as Total Market Weighting=the sum of the Market Weights of each of the bonds
Calculating the % Market Weighting for each of the bonds as % Market Weight=Market Weight of each bond/Total Market Weight Of note, in connection with FIGS. 6A, 6B, 7A, and 7B, the "face" is the amount outstanding and the "size" is an equal weight factor. Of further note, columns "E" and "H" of FIGS. 6A, 6B, 7A, and 7B reflect equal par weight (which type of weighting may be used for a liquid index, for example) and columns "J" and "K" of FIGS. 7A and 7B reflect actual face amounts (which type of weighting may be used for a broad index and/or a Total Return Swap, for example).

In another embodiment, a credit index according to the present invention may provide a mechanism to satisfy the need for a benchmark which: 1) accurately and timely tracks a broad market; 2) has "investor-friendly" features; and/or 3) may be used for performance management to enhance risk exposure and expected return.

In one example, which example is intended to be illustrative and not restrictive, such a benchmark may include, but not be limited to, a large cap or high yield liquid index of an investment grade which may be timely and frequently priced (e.g., essentially continuously in real-time (such as by the split second or by the second), in a delayed manner in quasi real-time (such as by the minute or by the hour), a fixed number of times during the day (such as 5 times daily), and/or daily). Such frequent pricing may permit index users to respond more quickly to market moves.

Further, the "investor-friendly" features may include: 1) an index which is open and transparent (e.g., data at index, sub-index, and/or bond level may be available to an investor), 2) an index which is audited (e.g., by a third party), 3) an index which is governed by a policy committee (members of which may be independent of the party initiating the index), 4) an index which is easy to understand (e.g., a rule-based index with commercial market applications); 5) an index with a web-based interface (e.g., one or more web pages) for providing market analytics (e.g., real-time and/or historic performance on any index or sub-index down to the individual bond level; 6) an index for which index quotations are available on one or more major financial media providers, and/or 7) an index run by a market leader with a long term commitment.

In another embodiment, a tradeable, liquid credit index according to the present invention may provide a mechanism by which risk factors are balanced to minimize the tracking error to the broad market. More particularly, as seen in one specific example shown in FIG. 8 (which example is intended to be illustrative and not restrictive), the design of a tradeable, liquid credit index according to the instant invention may recognize different risk factors (e.g., Ratings, Sectors, and Maturity) in a multi-dimensional array used in constructing an index tracking algorithm. Each cell (or "sub-index") of the array may be arranged in a manner similar to the manner in which a given market deals with risk. For example (which example is intended to be illustrative, and not restrictive), if a given cell has a particular weight in relation to the broad market, the tradeable, liquid credit index of the present invention may weight that cell with the same weight given by the broad market and certain credits may be selected into the cell and individually weighted so that the overall tradeable, liquid credit index tracks the broader market (which itself may be represented by a broad or aggregate credit index for tracking purposes).

Figure 8:
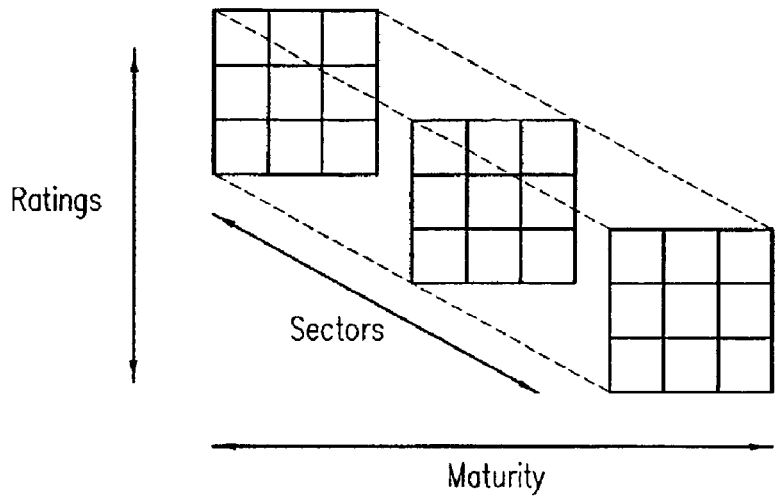
FIG. 8 shows a mechanism by which risk factors are balanced to minimize the tracking error to the broad market according to an embodiment of the present invention.

In another embodiment, a tradeable, liquid credit index according to the present invention may again provide a mechanism by which risk factors are balanced to minimize the tracking error to the broad market. More particularly, as seen in FIG. 8, the design of a tradeable, liquid credit index according to the instant invention may recognize different risk factors (e.g., Ratings, Sectors, and Maturity) in a multi-dimensional array used in constructing an index tracking algorithm. In this example (which example is intended to be illustrative and not restrictive), each row, column and height may be arranged in a manner similar to the manner in which a given market deals with risk (e.g., the rows, columns and heights may form "building blocks"—used for matching the profile of a market).

In another embodiment, a credit index according to the present invention may provide a financial vehicle that is appropriate to the increased credit specialization spreading across the fixed income markets as sophisticated managers are developing expertise to separate the management of duration/curve risk from credit risk.

In another embodiment, a credit index according to the present invention may provide a mechanism by which index quotes represent executable pricing, rather than indicative levels.

In another embodiment, a credit index according to the present invention may provide a mechanism by which credits within the index are priced individually (e.g., by a trading desk), rather than via matrix pricing.

In another embodiment, a credit index according to the present invention may provide a mechanism by which transaction costs are incorporated into the calculation of the credit index (e.g., credits may enter the index on the offered side while being marked on the bid side). While such incorporation of transaction costs may generate more conservative returns, it should report a level that an investor is more likely to experience while attempting to outperform the market.

In another embodiment, a credit index according to the present invention may comprise a liquid index that is a subset of a broader, aggregate index. Such a liquid index may represent the most liquid part of a broad market (e.g., a credit market), have a low tracking error, and/or be balanced and representative of the broad market.

In another embodiment, a credit index according to the present invention may comprise a fixed (or variable) number of credits which: 1) are maximally representative of a broad market; and 2) have the highest Liquidity Score.

In another embodiment, a credit index according to the present invention may comprise a fixed (or variable) number of credits (e.g., bonds) that are chosen in a balanced manner.

In another embodiment, a credit index according to the present invention may comprise the top liquid credits in a broad market.

In another embodiment, a credit index according to the present invention may provide a default probability that is lower than the broad market (in general, average default probability increases with the age of a bond and decreases with minimum rating requirements on an index).

In another embodiment, a credit index according to the present invention may provide a mechanism for balancing diversification with liquidity by utilizing the inventive Liquidity Score concept. More particularly, an objective of diversification is replication of an aggregate market, a manner of achieving diversification is by bringing new issues into the index (e.g., on a monthly basis) and by balancing index components between sectors (to gain exposure to the entire broader market), and a result of diversification is a low tracking error. On the other hand, an objective of liquidity is to produce a tradeable and liquid index, a manner of achieving liquidity is by employing the Liquidity Score concept and by bringing new issues into the index which are more liquid under the Liquidity Score concept than existing issues. In addition, limited "slippage" may be employed as a variable to control the turn-over of credit into the Indices.

In another embodiment, a credit index according to the present invention may provide a mechanism for balancing diversification with liquidity and administrative costs (associated with rebalancing the index by transferring credits into and out of the index) by maximizing the liquid credits in the index while minimizing the transference of credits into and out of the index.

In another embodiment, a credit index according to the present invention may provide a flexible and transparent mechanism for giving an investor the opportunity to reach a number of objectives, including, but not limited to, maximization of total return, leverage, maturity flexibility and principal protection.

Figure 9:
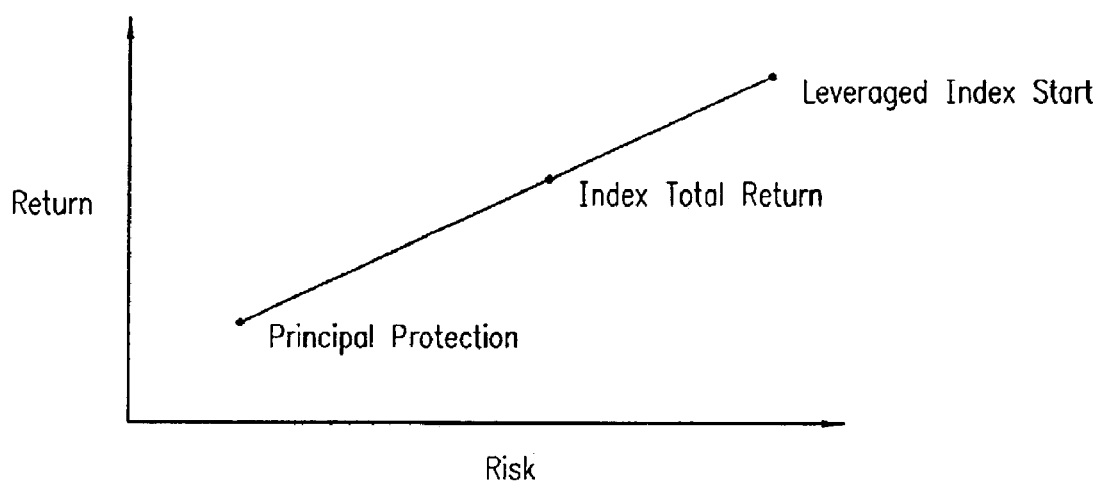
FIG. 9 shows a mechanism for giving an investor alternative risk profile options according to an embodiment of the present invention.

In another embodiment, a family of credit indices according to the present invention may provide a mechanism for giving an investor alternative risk profile options with regard to varying terms and structure and which offer a range of risk and return, as seen in FIG. 9, for example.

In another embodiment, a credit index according to the present invention may provide a mechanism for essentially tracking an allocation profile of a market (e.g., a sector rating of the market) while maintaining in the index the top liquid credits available in the market (i.e., the top liquid credits from the liquidity profile of the market).

In another embodiment, a credit index of the present invention can have a number (e.g., 4) of large "super-sectors" (e.g., Consumer/Finance/Industrial & Utilities/Telecom & Technology) divided into a number (e.g., 22) of separate industry sub-sector classifications. Further, a number (e.g., 11) of these sub-sectors may be divided into further sub-classifications. This allows detailed multi-layer analysis of the index that is believed to be necessary in the increasingly sophisticated credit market.

Figure 10B:
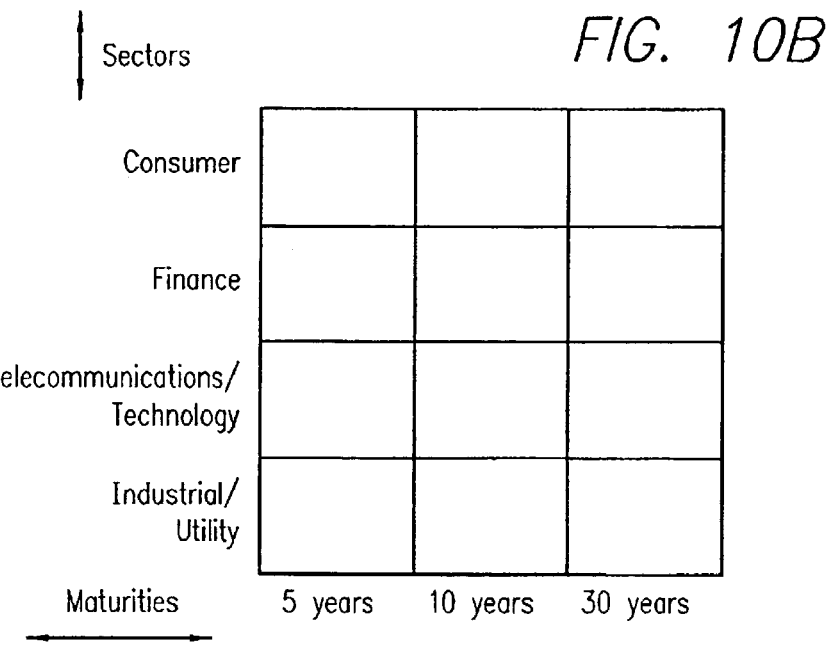
FIG. 10B shows a diagram depicting an example Reference Profile associated with an embodiment of the present invention.

In another embodiment, a credit index of the present invention can utilize a Market Profile (or "Reference Profile") as shown in FIG. 10A. More particularly, as seen in this FIG. 10A, and in FIG. 10B, the Reference Profile may have four sectors along one axis (e.g., Consumer, Finance, Telecommunications/Technology, and Industrial/Utility) and three maturities along the other axis (e.g., 5 year, 10 year, and 30 year). In addition, FIG. 10A shows various illustrative compositions of the above-mentioned Reference Profile.

In another embodiment, a credit index of the present invention can have a framework (e.g. a sector framework or a ratings framework) which is sufficiently similar to the framework used by a credit analysis organization (e.g., Moody's) to permit the calculation of a diversity score essentially continuously may be provided.

In another embodiment, a credit index according to the present invention may provide a more efficient mechanism for engaging in various investment strategies, including, but not limited to, total return swaps, total return index-linked notes, principal protected index-participation notes, and any desired derivative product (such as options, futures, and swaps, for example).

In one specific example, which example is intended to be illustrative and not restrictive, investors sharing a bullish view on a credit market (e.g., the European credit market, the U.S. credit market, or the Asian credit market) could enter into a total return swap ("TRS") in order to participate in potential market moves. Under this strategy, investors may assume diversified exposure without initial cash outlay and investors may gain credit exposure without costly replication strategies and specific credit analysis expertise. Thus, this strategy may suit risk takers with limited liquidity while providing full upside and downside exposure. Because of hedging ability with the present invention, there may no longer be a need to match orders in order to execute the various investment strategies previously discussed.

Figure 11:
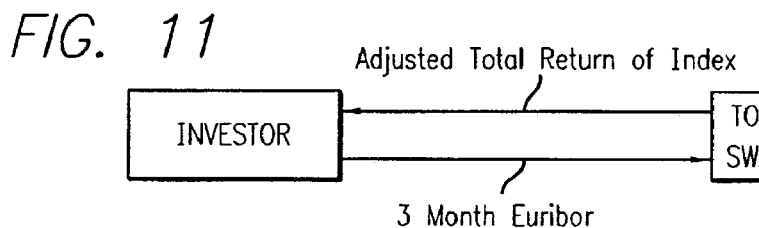
FIG. 11 shows a mechanism for carrying out a total return swap according to an embodiment of the present invention.

More particularly, as see in FIG. 11, the total return swap itself may initially be designed as a fixed term structure (e.g., 6 months) wherein the investor receives/pays the appreciation/depreciation of a liquid credit index according to the present invention at maturity according to a predetermined formula. In exchange, the investor may pay the counterparty an agreed reference amount (e.g., a 3 month Euribor or LIBOR). The total return on the liquid credit index may comprise any price changes over a given period plus any accrued interest plus any coupon payments and reinvestment income all divided by the price and the accrued interest at the beginning of the given period. The pricing may incorporate bid/offer spread on cash, as well as rebalancing on index and financing spreads. In another embodiment, the total return swap may be structured with several maturities.

In another embodiment, the present invention may he utilized in conjunction with one or more credit oriented Exchange Traded Funds ("ETF's"). Such credit oriented ETF's may include, but not be limited to, bonds, bank loans, and/or credit swaps.

Of note, the credit ETF according to the present invention may: 1) provide the ability to expand and contract to keep price in line with the underlying credits; 2) provide substantial liquidity; 3) provide diversified credit exposure, including long exposure and the ability to "time the market" by coming into and out of the market (particularly to investors lacking the resources to gain such exposure on their own); and 4) provide liability management, wherein exposure to the "class" of holders of the ETF is controlled and wherein exposure is concentrated as desired.

In another embodiment, a credit index according to the present invention may use a "roll" technique, wherein some or all of the credits which are bought and sold (i.e., moved into the index and moved out of the index) at a given time (e.g., during a periodic rebalancing) are bought and sold in one transaction. The periodic rebalancing may occur at any desired time, including, but not limited to, daily, weekly, monthly, quarterly, semi-annually, or annually.

In another embodiment, a credit index according to the present invention may use a "cheapest to deliver" technique, wherein: 1) the index is weighted towards the largest issuers in a market and/or towards particular maturities of credits issued by such issuers; and/or 2) credits of same issuers are normalized through a mathematical relationship to improve liquidity. The normalization of credits of different issuers may be used as a substitute for the Liquidity Score of the present invention or as an element of the Liquidity Score of the present invention.

In another embodiment of the present invention the rules of the index may be governed by a Policy Committee ("Committee"). The Committee may be composed of a predetermined number of external members (i.e., members unrelated to a party initiating the index). In one specific example, the predetermined number may be 50% of the full Committee. The Committee's decisions may be binding, and decisions may be required to be made with unanimity. The Committee may meet at least once a year to review the rules and composition of the index in the light of changing market structure (though the Committee may also strive for continuity). If there are exceptional circumstances that affect the entire market or a particular bond, any member may be able to call a meeting to request a ruling from the Committee as to whether certain bonds should be excluded from the index. In one specific example, the concern may be to ensure the liquidity of the bonds in the index. Further, a ruling may be requested if a bond trades below a predetermined percent (e.g., 50%) of par or accreted value for a predetermined number of days (e.g., 20 consecutive business days) after the value is verified with external data sources (e.g., Bloomberg, IDC) if available. Further still, a ruling may be requested if a spread widens more than a predetermined amount (e.g., 250 basis points) vs the index's spread.

In another embodiment of the present invention the rules for the bonds associated with the broad index could be the same as or different from the rules for the bonds associated with the liquid index and the rules for bonds already in an index (e.g., the broad index and/or the liquid index) could be the same as or different from the rules for bonds being considered for inclusion in an index (e.g., the broad index and/or the liquid index).

In another embodiment of the present invention the "chronic poor bidding performance" test may be modified such that if a bond tests positive on the last trading day prior to the first of the month, the bond is disqualified for a shorted period of time (e.g., only that coming month). In addition, liquid index incumbents that test positive may remain members of the liquid index.

In another embodiment of the present invention a credit index which may be used by a portfolio trader, which may be incorporated into a number of different investment/trading strategies, which may be used with one or more collateralized debt obligations ("CDB's"), and/or which provides access to a liquid asset is provided.

In another embodiment of the present invention the Liquidity Score may be utilized to determine a bond's liquidity in place of and/or in conjunction with volume trading data (which may be difficult to acquire).

In another embodiment of the present invention weighting of the liquid index is not necessarily performed using market weighting (wherein there may be concentration risk (e.g., the need to buy a large dollar amount of one or a few bonds) when a big sector has relatively few bonds qualified for inclusion). Rather, or in conjunction with such market weighting, the liquid index may use weighting which does not adjust the market weight of a cell to cover a broad market but instead uses the number of bonds in the cell as a weighting mechanism (e.g., the number of bonds that go into a cell are selected to achieve the desired weighting relative to the broader market or index). Of note, the standard deviation of sizes in each cell may, as a matter of practice in certain cases, "wash away", wherein using the number of bonds for weighting essentially mirrors the results of market weighting.

In another embodiment of the present invention a bond issuer which could fit in one or more industry sectors (i.e., a "conglomerate"), is placed in a single industry sector.

In another embodiment of the present invention a bond issuer which could fit in one or more industry sectors (i.e., a "conglomerate"), is placed in multiple industry sectors.

In another embodiment of the present invention the Spread Volatility test utilizes the universe of all bonds available in the market.

In another embodiment of the present invention the Market Profiling may be carried out annually, the Rebalancing may be carried out monthly, the broad index may be priced daily, and the liquid index may be priced in real-time or in quasi-real-time.

In another embodiment of the present invention performance of a liquid, tradable index may be measured using one or more of the following metrics: (a) tracking (how well does the liquid, tradeable index track a broad market or index); (b) transaction cost (relating to the total number of bonds that turnover [in one example, which example is intended to be illustrative and not restrictive, the turnover may be ⅔, or 20 for a 30 bond index]); (c) volumetric turnover (bid-bid/offer to bid [in one example, which example is intended to be illustrative and not restrictive, this value may be about 70 basis points per year]); (d) diversity (e.g., Moody's diversity score [in one example, which example is intended to be illustrative and not restrictive, diversity may be about 15.2 for a 30 bond index, wherein a higher score is better]); (e) incumbency premium (in one example, which example is intended to be illustrative and not restrictive, this value may be 60/40 [within issuer/outside issuer]); (f) front loading (e.g., a bond enters the liquid, tradeable index the same month that the bond issues [in one example, which example is intended to be illustrative and not restrictive, this value may be about ⅔]); (g) turnover period by period (this value may be qualitative); and (h) bonds selected are acceptable to one or more reviewers (this may be qualitative).

In another embodiment of the present invention the incumbency premium associated with the Liquidity Score may be determined as follows: Bonds that were members of the liquid index in at least the prior month may be assigned an incumbency premium to their Liquidity Score to reflect the notion that a new entry candidate would have to outscore an incumbent by a reasonable margin of additional liquidity in order to justify the expense of the trade. In addition, such incumbency premium may help to control turnover. In any case, in one specific example (which example is intended to be illustrative and not restrictive) the incumbency premium may be +6.0. More particularly:

The incumbency premium may stay constant for a new liquid index entrant for a "honeymoon" of x number of months (e.g., 4 months), and then the incumbency premium may begin to decay according to: $\exp(-0.3 \times (\text{incumbent months} - \text{honeymoon})) \times 6.0$.

All other bonds from an issuer who has an incumbent bond may also receive a premium equal to $2.4 \times \exp(-0.3 \times (\text{incumbent months} - \text{honeymoon}))$ [where honeymoon=0]. This "intra-issuer incumbency premium" may help facilitate moves to the on-the-run bond within a large complex of debt from a single issuer.

In another embodiment of the present invention the Market Profiling, the Annual Updating, the Selection Process, and/or the Bond Weighting associated with one or more indices (e.g., a broad index and/or a liquid index) may operate as follows:

Market Profile. Profile the broad market across industry sector and maturity dimensions. The Market Profile may be a 3×3 matrix, e.g.: 5-10-30 years to maturity on one axis, and Financial-Telecom-Other on the $2^{nd}$ axis (the intersection of each of these 3 elements may thus produce a final matrix of 9 cells).

Annual Update. Generate a new annual profile (e.g., every November 1, a date which corresponds roughly to the end of the underwriting season) as follows: The bonds in the broad index are scattered into the matrix, and the number of bonds in each cell is recorded. The proportionally equivalent number of bonds for the liquid index is then computed and recorded. That number stays constant for one year. Because underwriting effects during the year will change the fundamental composition of the broad market, do not load up the entire liquid index according to the matrix guideline. Instead, try to assign 15 bonds for the matrix based on this profile, subject to the conditions laid out below with reference to the Selection Process.

Selection Process. The finalized qualified entrant list is rank-ordered according to final Liquidity Score (which Liquidity Score has been described above) and the top x (e.g., 30 to 100) bonds are chosen in the following three phases:

a) First pass: The top x (e.g., 30 to 100) bonds are chosen, x per issuer (e.g., 1, 2, or 3), based on full 3-factor liquidity scores (that is, raw score+incumbency premium+issuer premium).

b) Second pass: The initial set of choices is then checked against the Market Profile matrix, which assigns a preferred bond count for each cell of the cube. A cell represents a cross-section of maturity, and industry sector. The goal of the matrix is to keep the number of bonds in each such cross-section, or cell, roughly proportionally representative of the broad market. The matrix is also used later in the algorithm to weight the bonds in a manner that is proportionally representative of the broad market (Bond Weighting below). For any cell that is underrepresented, a scan is made of the unselected bonds from that cell. If a bond is available that is y % (e.g., 90%) of the Liquidity Score of a bond in the current top queue from another cell, the swap is executed.

c) Third pass: A second swapping routine similar to the cell representation logic is then applied to test that each "element" on the maturity dimension of the matrix has at least x (e.g., 5) bonds. If a given element is underrepresented, a scan is made of the unselected bonds from that element, and if one can be found that is y % (e.g., 90%) of the Liquidity Score of a chosen bond from another element, the swap is executed.

d) To help diversify the product's credit risk, no more than x issues (e.g., 1, 2, or 3) per issuer may enter.

Bond Weighting. The base market weight of each chosen bond is then adjusted according to the following methodology (as opposed to being equal price weighted as discussed above):

a) Each bond in the broad index is placed into the appropriate cell in the matrix, and each bond in the liquid index is placed into a second matrix of the same design. The cell factors (see b below) from the prior month are applied to the current bonds. The percentage of total market value for each cell 1-9 relative to the market value of the total matrix is recorded for both matrices.

b) Factors are created for each element of each dimension of the Market Profile matrix—six in total. The product of any pair of such factors, selected from the two different matrix dimensions, defines a cell factor.

The cell factors are used to adjust the market sizes of the liquid index bonds in each one of the 9 cells. During rebalancing, the prior month factors are first applied. If the total market size percentages for the individual rows or columns of the liquid index matrix profile have drifted from the broad ones by less than x % (by subtraction), wherein x % is 2.5%, for example, the old factors remain in place for the current month. This reflects the notion that the cost of incurring the friction to buy additional securities only becomes worthwhile when tracking error is materially endangered. New factors are computed otherwise by solving a simultaneous set of equations to force the drift down to zero.

In another embodiment of the present invention the following bond selection criteria may be used. In one specific example (which example is intended to be illustrative and not restrictive), the broad index may be composed of euro-, euro-legacy-currency-, or sterling-denominated bonds issued by corporate issuers and rated by either (or both) Moody's and S&P. The index composition may be eligible for periodic rebalancing at a desired time (e.g., once a month). In one specific example (which example is intended to be illustrative and not restrictive), the rebalancing may occur after the close of business on the last business day of the month.

More particularly, in one specific example (which example is intended to be illustrative and not restrictive), for a bond to be included in the index (and/or remain in the index), the bond may have to meet the criteria described below at month-end:

Candidates:
  Bonds denominated in euros (or any European legacy currency) or the British pound.
  Geographic scope: The issuer or the issuer's guarantor (in the case of a finance subsidiary) may have to be domiciled or have most of its operations in Japan, Western Europe, or North America.
  New issues may have to have been settled before the rebalancing date to be included in the index for the next period. In one example (which example is intended to be illustrative and not restrictive), only bonds issued after Jan. 1, 1997, may be considered.
  Preferreds, perpetuals, and floating rate notes may not enter the index—however, bank capital step-ups that have this form may enter if the other rules are satisfied.
  Convertibles may not be considered as part of the candidate universe.
  The information for the selection of the bonds and their corresponding rating may be derived from the Bondware information service and/or the ISMA information service, each of which may be complemented by using it in conjunction with any further relevant market information.
  In one example (which example is intended to be illustrative and not restrictive), for a bond to enter and/or remain in the index, the remaining time to the bond's maturity may have to be equal to or greater than x year(s) (e.g., 1 to 3 years).

Quality:
  The bond may have to be rated by S&P and/or Moody's. In one specific example (which example is intended to be illustrative and not restrictive), the index may not include non-rated securities.
  Any existing credit ratings may have to be consistent with the index in which the bond will be classified, for example:
    High yield: below investment grade but not in default (BB+ or lower by Standard & Poor's and Ba1 or lower by Moody's)
    Investment Grade: above high yield
  In one specific example (which example is intended to be illustrative and not restrictive), an investment grade index may not include split-rated (e.g., Baa3/BB+ or Ba1/BBB) issues.
  In one specific example (which example is intended to be illustrative and not restrictive), issues rated D by S&P or that have been subject to a default press release by Moody's may not enter the index; those issues in the index that are subsequently downgraded to D by S&P or subject to a default press release by Moody's may be taken out of the index on the next rebalancing date.

Minimum Size:
  The outstanding face value of the bond must be greater or equal to: €500 million in one example, €500 million equivalent in another example, €200 million in another example, €200 million equivalent in another example, €100 million in another example, €100 million equivalent in another example, £60 million in another example, and €60 million equivalent in another example (wherein each example is intended, of course, to be illustrative and not restrictive)

Bond Type:
  Fixed coupon schedule: floating rate notes may be excluded (bank capital being a possible exception to this rule, as noted above).
  Step-ups with a coupon structure that changes on fixed dates or is a function of the issuer's rating may be included, as long as the formula and schedule are known at issuance. Deferred coupon bonds, zero coupon bonds, PIKs (pay-in-kinds) may be included as well.
  In one specific example (which example is intended to be illustrative and not restrictive), bonds with warrants attached may not be included in the index.

Monthly Rebalancing:
  The composition of the index may be held constant for any given calendar month to ensure continuity during the month and to avoid jumps unrelated to the price movements of the bonds.
  In one specific example (which example is intended to be illustrative and not restrictive), the inclusion and exclusion criteria above may be applied at month-end, after the close of business. If a bond conforms to all criteria listed above at month-end, it may be included in the index calculations for the next month. Bonds that were in the index, but that no longer satisfy all the criteria at month-end, may be removed from the index.
  If a bond becomes eligible in the middle of the month, it may still need to pass the test at the end of the month, and may only be included upon rebalancing at month end.
  When a bond is called, it may remain in the index at its call price until the end of the month, after which it may be removed.
  Changes in issue size that take place during the month may be taken into consideration only at the next rebalancing date.

Subindices:
  The bonds composing the subindices may be a subset of the bonds in the composite indices, and therefore have to pass the same eligibility tests.

Rating Comment for the Quality Sector Subindices (AAA, AA, A, BBB, BB, B, and CCC):

If a bond is rated by only one agency (e.g., Moody's or S&P), or if both agencies classify it in the same quality sector, it may be included in the corresponding quality sector subindex. For bonds with split ratings: the lower rating may prevail for Investment Grade indices and the higher rating may prevail for the High Yield indices.

Rating Migration from One Index to The Other:

In one specific example (which example is intended to be illustrative and not restrictive), bonds that are split rated (investment grade/high yield) with the ratings differing between Moody's and S&P may not be part of either an investment grade index or a high yield index. In this example, a bond may only be included if both agencies classify it in the same universe—or if it is only rated by one agency.

In one example (which example is intended to be illustrative and not restrictive), after a bond has migrated into investment grade (Rising Star) or high yield (Fallen Angel) from the other universe, it must remain x months (e.g., 3 months) in the new universe before it can be included in an index at the next following rebalancing date. This rule is intended to reduce volatility in the composition of the two indices, and to allow for the market participants to assess its fair value and credit worthiness.

In another embodiment, a tradeable, liquid, and balanced credit index according to the present invention may use the following multi-pronged bond selection methodology.

In one prong of the bond selection approach the index structure may be determined as follows in this specific example (which example is intended to be illustrative and not restrictive):

The index may be composed of a predetermined number of bonds (e.g., 30 to 100). This number is assuming, of course, that there are enough bonds available in the market that satisfy all selection criteria. In any case, the bonds in each index may form a subset of the bonds included in a corresponding aggregate index. The index structure may be based on market framework which seeks representation along x dimensions (e.g., 3) of the market (such as sector, ratings and maturity, for example (which example is intended to be illustrative and not restrictive)) and the index may seek to track the structure of a corresponding bond market (e.g., a corporate market). A Reference Profile for this purpose may be redefined periodically (e.g., monthly) as those bonds that constitute the corresponding aggregate index. This can help to ensure that the Reference Profile broadly evolves with the current trends in the market. To seek representation and balance, the index may comprise a minimum number of bonds proportional to the percentage of bonds found in the market along the above-mentioned dimensions.

In an alternative prong of the bond selection approach the index structure may be determined as follows in this specific example (which example is intended to be illustrative and not restrictive):

The index may be composed of a predetermined number of bonds (e.g., 30 to 100). This number is assuming, of course, that there are enough bonds available in the market that satisfy all selection criteria. In any case, the bonds in each index may form a subset of the bonds included in a corresponding aggregate index. The index structure may be based on market framework which seeks representation along x dimensions (e.g., 3) of the market (such as sector, ratings and maturity, for example (which example is intended to be illustrative and not restrictive)) and the index may seek to track the structure of a corresponding corporate bond market. A Reference Profile for this purpose may be redefined periodically (e.g., monthly) as those bonds that constitute the corresponding aggregate index. This can help to ensure that the Reference Profile broadly evolves with the current trends in the market.

Subsequently, issuers are selected who are the most representative of the market size and/or market capitalization. Then, at least one representative issue is selected from each of the selected issuers—maximizing liquidity. The resulting bond yields then have their weights adjusted to meet the profile of the desired market—wherein the weights are a function of both the total debt outstanding for the issuer and the adjustment of the three dimensional model to fit the desired market.

In the next prong of the bond selection approach, the selection of specific bonds may be carried out as follows in this specific example (which example is intended to be illustrative and not restrictive):

While the structure of each index may be constant for a predetermined interval (e.g., a whole year), the bonds comprising the index to "fill the matrix" may be chosen at a more frequent interval (e.g., at the end of every month) according to the following criteria:

Only bonds that are represented in a corresponding aggregate index may enter into the index. The minimum size of the issues in the indices may be: €500 million in one example, €500 million equivalent in another example, €200 million in another example, €200 million equivalent in another example, €100 million in another example, €100 million equivalent in another example, £60 million in another example, and €60 million equivalent in another example (wherein each example is intended, of course, to be illustrative and not restrictive)

To discriminate among bonds, a Liquidity Score may be imputed to each bond. As discussed above, the Liquidity Score may be a function of, among other things, the bond's size, the total issuance size of all bonds from that issuer in the index, and the bond's age. In one specific example (which example is intended to be illustrative and not restrictive), the higher the bond's and the issuer's outstanding amounts, and the lower the age, the higher the Liquidity Score.

In a specific example (which example is intended to be illustrative and not restrictive), a bond may be preferred to another one if the first bond has a higher Liquidity Score; however, bonds which were in the index in the previous period may receive a premium to their Liquidity Score in order to reduce turnover to cases where imputed liquidity is stronger beyond a preset threshold.

In one specific example (which example is intended to be illustrative and not restrictive), only one issue per issuer may be included in any index, unless it is part of another cell (e.g., different maturity or different rating (if these define different cells for that index)).

In another embodiment of a credit index according to the present invention, an index value calculation methodology may comprise the following procedure:

Calculations:
　For the aggregate indices, the index may be treated as a portfolio where each bond's weight is equal to its market capitalization. In one specific example (which example is intended to be illustrative and not restrictive), calculations may be made on a daily basis, using bid or ask prices (with reference to the market conditions prevailing at that time in that market (e.g., 6 p.m. London time or 3 p.m. New York time)).

Total Return:
　The components of the total return may include price changes, accrued interests, coupon payments, and reinvestment income on cash flows received in the middle of the period. In one specific example (which example is intended to be illustrative and not restrictive), the total return may be first computed on a daily basis for each single bond "i" following the formula:

$$TR_i = ((P1-P0)+(A1-A0)+C^*(1+r^*nb\ days/d))/(P0+A0),$$

where
　P0=Clean (flat) price at the beginning of the period (if the bond is new that period then P0 is offer; if the bond is incumbent that period then P0 is bid).
　P1=Clean (flat) price at the calculation date (always bid)
　A0=Accrued interest at the beginning of the period
　A1=Accrued interest at the calculation date
　C=Coupon payments received (note that this cash flow does not include repayments of the bond's par amount outstanding at the call price when a bond is called)
　r=Euro or GBP one-month LIBID rate at coupon payment date
　d=Day count convention for the reference LIBID instrument.

Then, a market-capitalization-weighted average of the individual total returns may be calculated using the beginning-of-the-period market value of each bond i as follows:

$$\text{Index } TR = \Sigma_i TR_i \times \text{Weight}_i,$$

where
　$\text{Weight}_i = \text{Par Amount}_i \times \text{Dirty Price}_i / (\Sigma_i \text{Par Amount}_i \times \text{Dirty Price}_i)$ taken at the last rebalancing date.

Index Value:
　All indices and subindices may be set at 100 at inception.
　The index value at month-end may be the compounded value of the monthly returns. Therefore, in one specific example (which example is intended to be illustrative and not restrictive) the formula:

$$\text{Index Value} = 100 \times \Pi_t(1+TR_t),$$

where $TR_t$ are the total returns calculated for the past months since inception may be used.
　During the month, the index value may be calculated by applying the total return since the start of that month to the index level at the last rebalancing date. Therefore, in one specific example (which example is intended to be illustrative and not restrictive), the formula may be as follows:

$$\text{Index Value}_{Current} = \text{Index Value}_{Rebalancing\ Date} \times (\text{Index } TR)$$

The index may be reweighted on a monthly basis using bond issuance, call and tender, and/or other relevant information.

Geographic scope of the indices:
　In one specific example (which example is intended to be illustrative and not restrictive), the bonds may come from issuers in Western Europe, North America and Japan. More particularly, in this example, only bonds from the following countries may be included in the indices: Andorra, Austria, Belgium, Denmark, Faeroe Islands, Finland, France, Germany, Gibraltar, Greece, Iceland, Ireland, Italy, Liechtenstein, Luxembourg, Malta, Monaco, Netherlands, Norway, Portugal, San Marino, Spain, Sweden, Switzerland, United Kingdom, Vatican City State, United States, Canada, or Japan.

Figure 12:
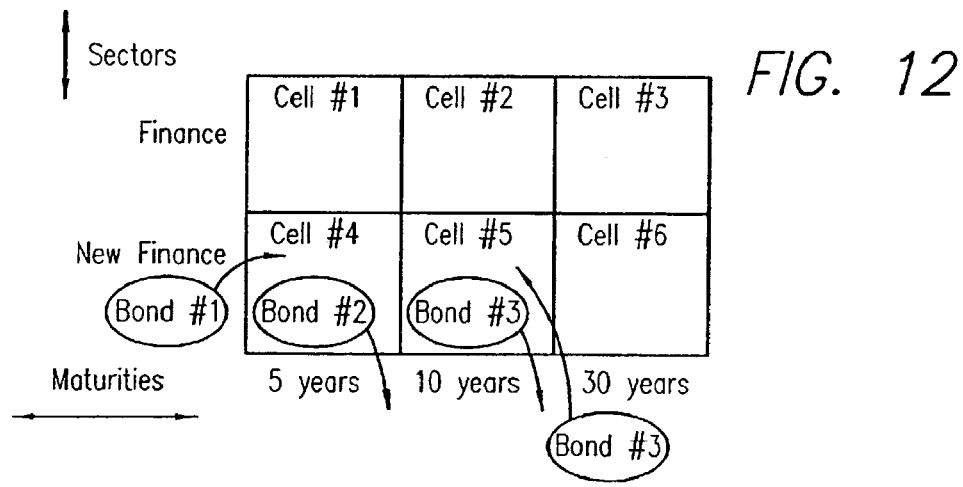
FIG. 12 shows a diagram depicting a "net gain testing" process according to an embodiment of the present invention.

Referring now to FIG. 12, a diagram depicting a "net gain testing" process according to an embodiment of the present invention is shown. As seen in this FIG. 12, the net gain testing is utilized to test whether a number of proposed transactions would result in a net Liquidity Score gain to an index. More particularly, in one example operation (which example is intended to be illustrative and not restrictive), if Bond#1 comes into Cell#4 and "knocks out" Bond#2, Bond# 3 must also come out of Cell# 5 and be replaced by Bond#4 (Bond#3 must come out when Bond#1 goes in because Bond#1 and Bond#3 are issued by the same issuer and in this example only one issue per issuer is permitted in the index). The net gain testing process will not allow these transactions to proceed unless the change in the average Liquidity Score for the index is positive (i.e., unless the sum of the Liquidity Scores of the incoming bonds is greater than the sum of the Liquidity Scores of the outgoing bonds).

Of note, this FIG. 12 depicts a 2×3 matrix (5 years, 10 years, and 30 years on one axis and Financial and Non-Financial on the other axis) for the purposes of illustration only, and any other desired matrix size and/or composition may, of course, be utilized. Further, while the net gain testing process is described with reference to FIG. 12 in connection with a 1 issue per issuer case, such net gain testing may, of course, be utilized with other cases (e.g., 2, 3, or more issues per issuer). Further still, in another example the net gain testing may permit a number of transactions as long as the net result is not a loss in average Liquidity Score for the index (i.e., if the net gain is positive or zero).

In another embodiment data from an NASD sponsored program called "TRACE" (designed to provide trading related data on essentially every applicable bond trade) may be utilized. More particularly, data from TRACE may be utilized in the calculation of a Raw Score and/or a Liquidity Score according to the invention (and/or the data from TRACE may be utilized to verify a Raw Score and/or a Liquidity Score). In this regard, it is noted that the TRACE data may be utilized in one example, which example is intended to be illustrative and not restrictive, to determine how prices move from trade to trade. In another example of how such TRACE data may be utilized (which example is intended to be illustrative and not restrictive), it is noted that the frequency with which an instrument (such as a bond) trades may aid in providing an indication of liquidity.

In another embodiment data from program(s) other than TRACE which provide trading related data and/or data from other sources (e.g., investment institutions other than the sponsor of a broad index and/or a liquidity index) may be utilized in the calculation of a Raw Score and/or a Liquidity Score according to the invention (and/or such data may be utilized to verify a Raw Score and/or a Liquidity Score).

In another embodiment a credit index (e.g., a liquid credit index) is provided which is periodically rebalanced and tradeable.

In another embodiment a system and method are used for structuring a credit index (e.g., a liquid credit index) which is periodically rebalanced and tradeable.

In another embodiment a system and method are used for operating a credit index (e.g., a liquid credit index) which is periodically rebalanced and tradeable.

In another embodiment a system and method are used for determining the liquidity of a credit, such as a bond.

In another embodiment a mechanism for structuring and/or operating a rule-based modified market capitalization weighted index of bonds is provided.

In another embodiment a mechanism is provided for ranking liquidity.

In another embodiment a credit index (e.g., a liquid credit index) is provided which utilizes a mechanism for ranking liquidity.

In another embodiment if there are not enough bonds initially available to populate the liquid index (e.g., if there are insufficient bonds available in the market and/or in the broad index which meet the requirements of the liquid index) then the liquid index may be populated with as many bonds as possible and periodic re-profiling (e.g., monthly) may be carried out until the liquid index is fully populated.

In another embodiment a software program for determining a liquidity score associated with a bond issued by an issuer is provided, comprising: means for determining a raw score which is a function of the age and size of the bond; means for determining a model issuer premium associated with the issuer; means for determining an applied issuer premium associated with the bond, which applied issuer premium is based at least in part on the model issuer premium; and means for combining at least the raw score and the applied issuer premium to determine the liquidity score.

In another embodiment a software program for populating an index of a plurality of bonds, each of which bonds is issued by an issuer is provided, comprising: means for disqualifying any of the bonds in an initial candidate subset of bonds from inclusion in the index of bonds for one or more disqualifying conditions; means for determining a liquidity score for each of the bonds in the initial candidate subset of bonds which is not disqualified, wherein said liquidity score is determined at least in part by: (a) determining a raw score which is a function of the age and size of the bond; (b) determining a model issuer premium associated with the issuer; (c) determining an applied issuer premium associated with the bond, which applied issuer premium is based at least in part on the model issuer premium; and (d) combining at least the raw score and the applied issuer premium to determine the liquidity score; means for segmenting the bonds in the initial candidate subset of bonds into a matrix; and means for including one or more bonds from the initial candidate subset of bonds in the index of bonds based at least in part upon the liquidity score of the included bond and a position of the included bond in the matrix associated with the initial candidate subset of bonds.

While a number of embodiments of the present invention have been described, it is understood that these embodiments are illustrative only, and not restrictive, and that many modifications may become apparent to those of ordinary skill in the art. For example, the analytic data provided via the web-based interface may include performance data (such as performance summary, performance attribution, best/worst performers, sector weightings, relative value analysis, and spread movements shown against their 60-day trading range, for example). Further, such performance data may be given on a comparative basis (such as across industries, for example,) and may be shown in graph form. Further still, the present invention may be employed in the context of an Index Mutual Fund (i.e., a mutual fund composed of one or more different indices), wherein each index may use liquid underlying components (e.g., credits). Further still, while the present invention has been described principally with respect to a method for structuring and/or implementing a credit index (and/or a Liquidity Score), a corresponding software program and/or system may of course be utilized to structure or help to structure a credit index and/or to implement or help to implement a credit index and/or to structure or help to structure a Liquidity Score and/or to implement or help to implement a Liquidity Score. Further still, the present invention may be employed with a "basket" of financial instruments and the disclosure above modified accordingly. Further still, the broad index used as a candidate pool for the liquid index of the present invention may utilize any desired operating rules (e.g., bonds must settle prior to the first of the month in order to enter for that month; bonds are assigned to specific issuer entities by a sponsor and/or administrator associated with the broad index; and/or bonds are coded into the industry taxonomy by a sponsor and/or administrator associated with the broad index). Further still, the Market Profile matrix may comprise what is sometime referred to mathematically as a "hyper-cube". Further still, the Raw Score may be calculated as a planar regression (e.g., against volume data). Further still, any of the functions and/or constants disclosed herein could be changed or modified according to tests on actual data and/or simulations. Further still, the Liquidity Score of the present invention may be used on its own (i.e., not in connection with an index), wherein the Raw Score and/or Issuer Premium components are used to calculate the Liquidity Score without reference to the Incumbency Premium component. Further still, the act of including a credit in an index according to the present invention (e.g., a liquid, tradeable index) may increase the liquidity of the credit.

What is claimed is:

1. A software program encoded on a computer readable medium for populating an index of credits, each of which credits is issued by an issuer, comprising:
   means for determining a liquidity score for each credit being considered for inclusion in the index, wherein said liquidity score for each of the credits is determined at least in part by: (a) determining a raw score for each of the credits, wherein each raw score is a function of the age and size of a respective credit; (b) determining a model issuer premium for each issuer of at least one of the credits; (c) determining an applied issuer premium for each of the credits, wherein each applied issuer premium is based at least in part on the model issuer premium of the issuer of a respective credit; and (d) combining, for each of the credits, at least a respective raw score and a respective applied issuer premium to determine the liquidity score; and
   means for including, in the index of credits, at least one of the credits being considered for inclusion in the index of credits based at least in part upon the liquidity score of the credit.

2. A software program encoded on a computer readable medium for populating an index of credits, each of which credits is issued by an issuer, comprising:
   means for determining a liquidity score for each credit being considered for inclusion in the index and for each credit already included in the index, wherein said liquidity score for each of the credits is determined at least in part by: (a) determining a raw score for each of the credits, wherein each raw score is a function of the age and size of a respective credit; (b) determining a model issuer premium for each issuer of at least one of the credits; (c) determining an applied issuer premium for each of the credits, wherein each applied issuer premium is based at least in part on the model issuer premium of the issuer of a respective credit; and (d) combining, for each of the credits, at least a respective raw score and a respective applied issuer premium to determine the liquidity score;

means for including, in the index of credits, at least one of the credits being considered for inclusion in the index of credits based at least in part upon the liquidity score of the credit; and means for removing, from the index of credits, at least one of the credits already included in the index of credits.

3. The software program of claim 2, wherein at least one of the credits already included in the index of credits is removed based at least in part upon the liquidity score of the credit.

4. A method for populating an index of credits, each of which credits is issued by an issuer, comprising:

determining a liquidity score for each credit being considered for inclusion in the index, wherein said liquidity score for each of the credits is determined at least in part by: (a) determining a raw score for each of the credits, wherein each raw score is a function of the age and size of a respective credit; (b) determining a model issuer premium for each issuer of at least one of the credits; (c) determining an applied issuer premium for each of the credits, wherein each applied issuer premium is based at least in part on the model issuer premium of the issuer of a respective credit; and (d) combining, for each of the credits, at least a respective raw score and a respective applied issuer premium to determine the liquidity score; and including, in the index of credits, at least one of the credits being considered for inclusion in the index of credits based at least in part upon the liquidity score of the credit.

5. The method of claim 4, further comprising forming a candidate subset of credits from which each credit being considered for inclusion in the index of credits is selected.

6. The method of claim 5, further comprising segmenting the credits in the candidate subset of credits into an n-dimensional structure.

7. The method of claim 6, wherein the step of including further comprises including, in the index of credits, at least one of the credits from the candidate subset of credits based at least in part upon the liquidity score of the credit and a position of the credit in the n-dimensional structure associated with the candidate subset of credits.

8. The method of claim 5, wherein the candidate subset of credits comprises a subset of all credits available in at least one predetermined market.

9. The method of claim 5, wherein a composition of the candidate subset of credits is changed periodically.

10. The method of claim 9, wherein the composition of the candidate subset of credits is changed periodically at an interval selected from the group including: (a) daily; (b) weekly; (c) monthly; (d) quarterly; (e) semi-annually; and (f) annually.

11. The method of claim 4, wherein each credit is selected from the group including: (a) a bond; (b) a loan; and (c) a derivative.

12. A method for populating an index of credits, each of which credits is issued by an issuer, comprising:

determining a liquidity score for each credit being considered for inclusion in the index and for each credit already included in the index, wherein said liquidity score for each of the credits is determined at least in part by: (a) determining a raw score for each of the credits, wherein each raw score is a function of the age and size of a respective credit; (b) determining a model issuer premium for each issuer of at least one of the credits; (c) determining an applied issuer premium for each of the credits, wherein each applied issuer premium is based at least in part on the model issuer premium of the issuer of a respective credit; and (d) combining, for each of the credits, at least a respective raw score and a respective applied issuer premium to determine the liquidity score;

including, in the index of credits, at least one of the credits being considered for inclusion in the index of credits based at least in part upon the liquidity score of the credit; and removing, from the index of credits, at least one of the credits already included in the index of credits.

13. The method of claim 12, wherein at least one of the credits already included in the index of credits is removed based at least in part upon the liquidity score of the credit.

14. The method of claim 12, further comprising forming a candidate subset of credits from which each credit being considered for inclusion in the index of credits is selected.

15. The method of claim 14, further comprising segmenting the credits in the candidate subset of credits into an n-dimensional structure.

16. The method of claim 15, wherein:

the step of including further comprises including, in the index of credits, at least one of the credits from the candidate subset of credits based at least in part upon the liquidity score of the credit and a position of the credit in the n-dimensional structure associated with the candidate subset of credits; and the step of removing further comprises removing, from the index of credits, at least one of the credits already included in the index of credits based at least in part upon the liquidity score of the credit and a position of the credit in the n-dimensional structure associated with the candidate subset of credits.

17. The method of claim 16, wherein:

the step of including further comprises including, in the index of credits, at least one of the credits from the candidate subset of credits based at least in part upon the liquidity score of the included credit being higher than at least one other liquidity score of a credit in the same position in the n-dimensional structure as the included credit; and the step of removing further comprises removing, from the index of credits, at least one of the credits already included in the index of credits based at least in part upon the liquidity score of the removed credit being lower than at least one other liquidity score of a credit in the same position in the n-dimensional structure as the removed credit.

18. The method of claim 15, wherein the candidate subset of credits comprises a subset of all credits available in at least one predetermined market.

19. The method of claim 15, wherein a composition of the candidate subset of credits is changed periodically.

20. The method of claim 19, wherein the composition of the candidate subset of credits is changed periodically at an interval selected from the group including: (a) daily; (b) weekly; (c) monthly; (d) quarterly; (e) semi-annually; and (f) annually.

21. The method of claim 15, further comprising disqualifying any of the credits in the candidate subset of credits from inclusion in the index of credits for one or more disqualifying conditions.

22. The method of claim 21, wherein a disqualifying condition is selected from the group including: (a) failing a chronic poor bidding performance test; (b) failing a lockout period test; (c) failing a minimum potential run test; and (d) failing a spread volatility test.

23. The method of claim 22, wherein failure of the chronic poor bidding performance test comprises having a spread to a government benchmark that is bid at least x basis points over an average spread for the candidate subset of credits for at least y business days over z prior months.

24. The method of claim 23, wherein the government benchmark is a 10 year treasury, x basis points is 250 basis points, y business days is 6 business days, and z prior months is 2 prior months.

25. The method of claim 24, wherein failure of the chronic poor bidding performance test results in disqualification from inclusion in the index of credits for j months.

26. The method of claim 25, wherein j months is between 1 and 12 months.

27. The method of claim 26, wherein j months is 6 months.

28. The method of claim 22, wherein the step of removing further comprises removing, from the index of credits, at least one of the credits already included in the index of credits based at least in part upon a failure of the chronic poor bidding performance test.

29. The method of claim 22, wherein failure of the lockout period test comprises failing to have been excluded from the index of credits for at least x months after having fallen out from the index of credits.

30. The method of claim 29, wherein x months is between 1 and 6 months.

31. The method of claim 30, wherein x months is 3 months.

32. The method of claim 22, wherein failure of the minimum potential run test comprises failing to have a minimum potential run in the index of credits of at least x months.

33. The method of claim 32, wherein x months is between 1 and 6 months.

34. The method of claim 33, wherein x months is 3 months.

35. The method of claim 22, wherein failure of the spread volatility test comprises having a volatility greater than a permitted maximum volatility.

36. The method of claim 35, wherein the permitted maximum volatility is determined as follows:
    (a) determine an x-month par asset swap spread history of each credit in the candidate subset of credits;
    (b) from each credit's spread history, determine a standard deviation ($\sigma$) of the daily changes and record the natural logarithm of each standard deviation ($\sigma$) into a vector;
    (c) using each vector, determine a mean ($\mu$) and a standard deviation ($\sigma$) corresponding to all vectors;
    (d) using the mean ($\mu$) and standard deviation ($\sigma$) corresponding to all vectors, assign the permitted maximum volatility the value $\mu+2.576\ \sigma$, which corresponds to a 1% percentile under a normal distribution assumption.

37. The method of claim 22, wherein the step of removing further comprises removing, from the index of credits, at least one of the credits already included in the index of credits based at least in part upon failing to meet the spread volatility test.

38. The method of claim 15, wherein the credits in the candidate subset of credits are segmented according to a maturity characteristic of each credit and an industry sector characteristic of each credit.

39. The method of claim 15, wherein the n-dimensional structure is a 3 by 4 matrix.

40. The method of claim 39, wherein the matrix includes 3 maturity characteristics and 4 industry sector characteristics.

41. The method of claim 40, wherein the 3 maturity characteristics comprise a 5 year maturity, a 10 year maturity, and a 30 year maturity and wherein the 4 industry sector characteristics comprise a consumer industry sector, a financial industry sector, a telecommunications/technology industry sector, and an industrial/utility industry sector.

42. The method of claim 12, wherein each raw score decreases with increasing age of a respective credit and each raw score increases with increasing size of a respective credit.

43. The method of claim 42, wherein each raw score decreases exponentially with increasing age of a respective credit and each raw score increases logarithmically with increasing size of a respective credit.

44. The method of claim 43, wherein each raw score is determined using the formula:

$$\text{raw score} = \max(j, k \times \ln(\text{size})-1) \times \exp(-m \times \text{avg age}),$$

where avg age is a face-weighted average age of any add-ons to a respective credit plus the original principal that is part of a respective credit, size is a monetary value of any add-ons to a respective credit plus the original principal that is part of a respective credit, ln is the natural log, exp is the base of the natural log, and the function max sets a floor for the value of each raw score at j.

45. The method of claim 44, wherein j=0, k=3, l=15, and m=0.3.

46. The method of claim 12, wherein the model issuer premium of each issuer is determined by:
    (a) calculating, for each issuer, an aggregate age-adjusted debt based on each credit issued by the issuer;
    (b) identifying the largest aggregate age-adjusted debt; and
    (c) assigning, to each issuer, the model issuer premium according to the formula: model issuer premium =y × (aggregate age-adjusted debt of the issuer/largest aggregate age-adjusted debt), where y is a predetermined value.

47. The method of claim 46, wherein y=12.

48. The method of claim 12, wherein each applied issuer premium is determined by assigning to each credit a fraction of the entire model issuer premium of a respective issuer, wherein the fraction equals a ratio of the raw score of the credit to the largest raw score of any credit issued by the respective issuer.

49. The method of claim 12, wherein, for each of the credits being considered for inclusion in the index of credits and for each of the credits already included in the index of credits, each associated raw score and each associated applied issuer premium are combined in an additive manner to determine the liquidity score.

50. The method of claim 12, wherein at least one liquidity score is determined by combining, for one of the credits which is already included in the index of credits, at least: (a) a respective raw score; (b) a respective applied issuer premium; and (c) an incumbency premium.

51. The method of claim 50, wherein the incumbency premium is calculated using the formula: incumbency premium =j × exp(−k × avg age), where avg age is a face-weighted average age of any add-ons to a respective credit plus the original principal that is part of a respective credit.

52. The method of claim 51, wherein j=6 and k=0.3.

53. The method of claim 52, wherein at least one liquidity score is determined by combining, for one of the credits being considered for inclusion in the index of credits, at least: (a) a respective raw score; (b) a respective applied issuer premium; and (c) an intra-issuer incumbency premium.

54. The method of claim 53, wherein the intra-issuer incumbency premium is calculated using the formula: intra-issuer incumbency premium = m x exp(−n x avg age), where avg age is a face-weighted average age of any add-ons to a respective credit plus the original principal that is part of a respective credit.

55. The method of claim 54, wherein m is a percentage of j.

56. The method of claim 55, wherein m=0.4 x j and n=0.3.

57. The method of claim 12, wherein each credit is selected from the group including: (a) a bond; (b) a loan; and (c) a derivative.

* * * * *